US012496526B1

(12) United States Patent
Li et al.

(10) Patent No.: US 12,496,526 B1
(45) Date of Patent: Dec. 16, 2025

(54) IMAGE DRAWING NON-FUNGIBLE TOKEN VIDEO GAME

(71) Applicant: A&C Technology, Inc., Newport Beach, CA (US)

(72) Inventors: Shihao Li, Newport Beach, CA (US); Ye Zhao, Newport Beach, CA (US); Han Qin, Newport Beach, CA (US); Jiayang Qin, Newport Beach, CA (US); Zhen Sun, Newport Beach, CA (US); Hao Hsu, Newport Beach, CA (US)

(73) Assignee: A&C Technology, Inc., Newport Beach, CA (US)

( * ) Notice: Subject to any disclaimer, the term of this patent is extended or adjusted under 35 U.S.C. 154(b) by 163 days.

(21) Appl. No.: 18/482,603

(22) Filed: Oct. 6, 2023

Related U.S. Application Data

(60) Provisional application No. 63/413,877, filed on Oct. 6, 2022.

(51) Int. Cl.

| | |
|---|---|
| ***A63F 13/63*** | (2014.01) |
| ***A63F 13/352*** | (2014.01) |
| ***A63F 13/69*** | (2014.01) |
| ***A63F 13/70*** | (2014.01) |
| ***A63F 13/73*** | (2014.01) |
| ***A63F 13/75*** | (2014.01) |
| ***A63F 13/79*** | (2014.01) |

(Continued)

(52) U.S. Cl.
CPC ............ *A63F 13/63* (2014.09); *A63F 13/352* (2014.09); *A63F 13/69* (2014.09); *A63F 13/70* (2014.09); *A63F 13/73* (2014.09); *A63F 13/75* (2014.09); *A63F 13/79* (2014.09); *A63F 13/792* (2014.09); *A63F 13/80* (2014.09); *A63F 2300/575* (2013.01)

(58) Field of Classification Search
CPC .......... A63F 13/80; A63F 13/79; A63F 13/69; A63F 13/63; A63F 13/73; A63F 13/792; A63F 13/352; A63F 13/70; A63F 13/75; A63F 2300/575; H04L 9/50; H04L 9/3239; H04L 2209/56; G06Q 20/1235
See application file for complete search history.

(56) References Cited

U.S. PATENT DOCUMENTS

| | | | | |
|---|---|---|---|---|
| 10,694,070 | B2 | 6/2020 | Tokuchi | |
| 10,726,107 | B2 * | 7/2020 | Cunningham | G06Q 20/3829 |
| 10,739,951 | B2 | 8/2020 | Rosenberg | |

(Continued)

*Primary Examiner* — William H Mcculloch, Jr.
(74) *Attorney, Agent, or Firm* — Makoui Law, PC; Ali Makoui

(57) ABSTRACT

A non-fungible token (NFT) game is provided that allows the players to create image NFTs from color pixel NFTs. The NFT game provides the tools for the players to mint different color pixel NFTs with different sizes different shapes, and different colors. The players may search for and may buy different color pixel NFTs. The players may sell the images they create and may buy images created by other players. The game provides a drawing pad and displays at least a subset of the color pixel NFTs that a player owns. The player may generate an image by moving the color pixel NFTs into the drawing pad. The player may mint an image NFT from the color pixel NFTs moved into the drawing pad. After the image NFT is minted, the color pixel NFTs used in drawing the image NFT are burned.

20 Claims, 24 Drawing Sheets

(51) Int. Cl.
*A63F 13/792* (2014.01)
*A63F 13/80* (2014.01)

(56) References Cited

U.S. PATENT DOCUMENTS 10,751,628 B2 * 8/2020 Packin .................. H04L 9/3239
10,850,202 B1 * 12/2020 Koch .................... G06Q 20/381
10,861,095 B1 * 12/2020 Koch ................ G06Q 20/38215
10,946,283 B1 * 3/2021 Meilich .............. G06Q 20/3674
10,984,400 B1 * 4/2021 Koch ...................... A63F 13/31
11,182,979 B2 11/2021 Daly
11,269,858 B2 3/2022 Verma et al.
11,373,174 B1 * 6/2022 Cunningham ............ H04L 9/50
11,394,793 B2 * 7/2022 Thai ............... H04N 21/440218
11,511,198 B1 * 11/2022 Thacker .................. A63F 13/79
11,511,201 B1 * 11/2022 Thacker .................. A63F 13/55
11,663,551 B2 * 5/2023 Stephens ................. H04L 63/12 705/28
11,673,054 B2 * 6/2023 Berger ................. G06V 40/103 463/31
11,687,899 B2 * 6/2023 Koch ...................... A63F 13/31 705/26.4
11,687,923 B2 * 6/2023 Cunningham .......... A63F 13/73 705/59
11,707,685 B2 * 7/2023 Koch ...................... A63F 13/73 463/42
11,724,200 B2 * 8/2023 Packin .................. A63F 13/792 463/42
11,833,435 B2 * 12/2023 Thacker .................. A63F 13/69
11,865,459 B1 * 1/2024 Leondires ............... A63F 13/48
11,883,748 B2 * 1/2024 Yang ..................... A63F 13/792
11,935,146 B2 * 3/2024 Linden .................... G06F 21/10
11,951,400 B2 * 4/2024 Yong ....................... A63F 13/34
11,986,736 B1 * 5/2024 Khan .................... A63F 13/792
12,076,651 B2 * 9/2024 Thacker .................. A63F 13/85
12,106,292 B2 * 10/2024 Cunningham ........ H04L 9/3234
12,179,120 B2 * 12/2024 Koch .................. G07F 17/3241
12,290,755 B2 * 5/2025 Meyers ................... A63F 13/58
12,299,758 B2 * 5/2025 Rosenberg ........... G06Q 50/184
2012/0233555 A1 9/2012 Psistakis et al.
2020/0038761 A1 * 2/2020 Packin .................. A63F 13/828
2020/0110855 A1 * 4/2020 Cunningham ..... G06Q 20/3829
2020/0162236 A1 5/2020 Miller et al.
2020/0334771 A1 10/2020 Li
2020/0358784 A1 11/2020 Khaund
2020/0372835 A1 11/2020 Li
2021/0037270 A1 2/2021 Taylor et al.
2021/0051013 A1 2/2021 Li
2021/0089664 A1 3/2021 Li
2021/0141885 A1 5/2021 Witchey et al.
2021/0150003 A1 5/2021 Smaiely et al.
2021/0152327 A1 5/2021 Givental et al.
2021/0326357 A1 10/2021 Han
2021/0357447 A1 11/2021 McKenzie
2021/0409489 A1 * 12/2021 Speasl ................... H04L 63/123
2022/0016529 A1 * 1/2022 Meilich ................. H04L 63/123
2022/0075845 A1 3/2022 Bowen et al.
2022/0215361 A1 * 7/2022 Koch .................. G06Q 20/123
2022/0254069 A1 8/2022 Li
2022/0305378 A1 * 9/2022 Ward .................... A63F 13/235
2023/0075256 A1 * 3/2023 Berger ................... G06Q 50/01
2023/0182025 A1 * 6/2023 Benedetto ............ G06Q 20/123 463/42
2023/0377056 A1 * 11/2023 Yang .................... G06Q 20/389
2024/0139632 A1 * 5/2024 Khan .................. G06Q 20/123
2024/0198239 A1 * 6/2024 Tamate ................... A63F 13/85
2025/0095056 A1 * 3/2025 Luo ......................... G06F 21/64
2025/0209142 A1 * 6/2025 Inagaki .................. G06Q 30/06

* cited by examiner

IMAGE DRAWING NON-FUNGIBLE TOKEN VIDEO GAME

CLAIM OF BENEFIT TO PRIOR APPLICATIONS

This application claims the benefit of U.S. Provisional Patent Application Ser. No. 63/413,877, filed on Oct. 6, 2022. The contents of U.S. Provisional Patent Application 63/413,877 are hereby incorporated by reference.

BACKGROUND

A blockchain is a decentralized and immutable digital ledger that includes a growing list of records (or blocks) that are cryptographically linked together. Each block may include a cryptographic hash of the previous block, a timestamp, and transaction data.

A blockchain token is a digital asset that is stored on a blockchain. Each blockchain token represents a set of rules encoded in a smart contract. A smart contract is a program published and run on the blockchain. It is a collection of codes and data which exist on a specific address on the blockchain. The codes are open sourced to the public, the inputs are determined, and the results are predictable. The codes are executed automatically and cannot be deterred. Also, due to the nature of the blockchain, it is not possible to modify either the code or the data without notifying other users on the chain. This feature provides fairness to both parties participated in the transaction and prevents data manipulation.

Non-Fungible Tokens (NFTs) are cryptographic assets with unique characteristics that distinguish them from each other on the blockchain. Each NFT is a record on a blockchain that is associated with a specific digital or physical asset. The NFTs may represent objects such as art, music, videos, and video game items.

The foremost advantage of the NFTs is evident in the proof of ownership. Since the NFTs are on a blockchain network, they help in associating ownership to a single account. Most important of all, the NFTs are indivisible and could not be distributed among multiple owners. At the same time, the ownership advantages of the NFTs ensure that buyers are safe from the concerns of fake NFTs.

The NFTs are created on the blockchain, thereby implying the association of unique records with them. The unique traits of the NFTs showcase their potential for contributing value. At the same time, the NFT creators have the privilege of issuing only a specific number of NFTs to introduce scarcity of supply. The NFTs are transferable. The NFTs may be sold, gifted, or traded from different platforms at users' willing. Current NFT trading platforms include OpenSea, Radible, and others.

Most mainstream NFTs are different images. A pixel is the smallest addressable element that makes up the representation of an image in a computer's memory. Each pixel is a dot of an entire image. Many pixels may compose an entire image. The intensity of each pixel is variable. In a computer's color imaging system, a color is typically represented by three intensities: red, green, and blue.

BRIEF DESCRIPTION OF THE DRAWINGS

The various embodiments of the present image drawing NFT video game now will be discussed in detail with an emphasis on highlighting the advantageous features. These embodiments depict the novel and non-obvious image drawing NFT video game shown in the accompanying drawings, which are for illustrative purposes only. These drawings include the following figures, in which like numerals indicate like parts.

DETAILED DESCRIPTION

Figure 1A:
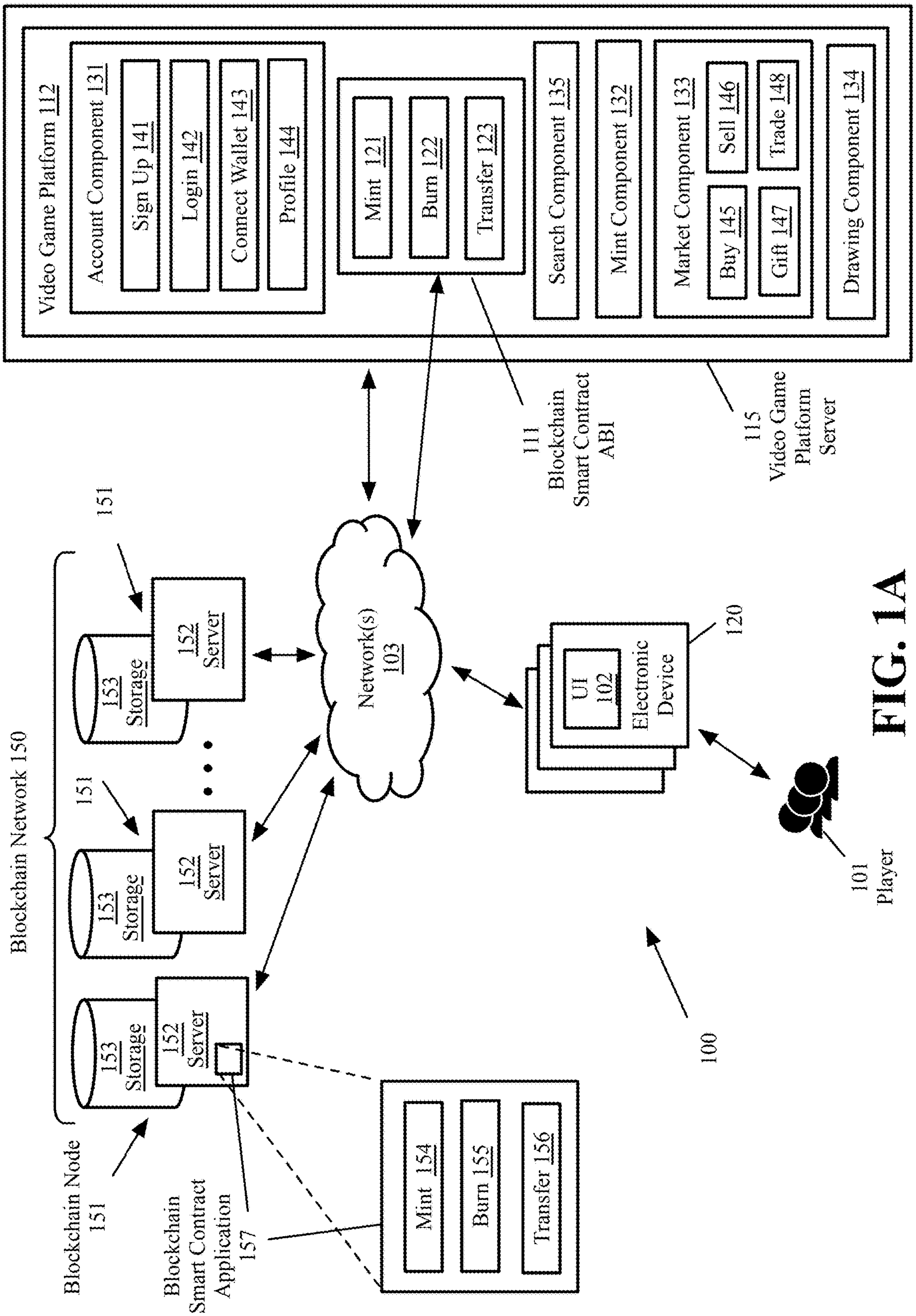
FIG. 1A is a functional block diagram illustrating an example system for an image drawing NFT video game, according to various aspects of the present disclosure.

A video game is an electronic game that is played by electronically manipulating images produced by a computer program on a display screen. An NFT video game, is a video game in which players may buy, sell, gift, or trade NFTs. One aspect of the present embodiments includes the realization that the existing NFT collections that involve buying, selling, and trading of NFTs do not allow the players to create (or draw) their own NFTs. The players may only buy, sell, or trade images from existing collections. Most of the existing NFTs nowadays are collections of a specific topic and the players may only get NFTs related to that topic.

Some of the present embodiments solve the aforementioned problems by providing an NFT video game that allows the players to create the images they want. The players may sell the images they create and/or may buy the images created by other players. Some embodiments provide an image drawing NFT video game where the players may mint different pixel NFTs with different sizes, different shapes, and different colors. The players may also search for, and may buy or sell, different pixel NFTs. The players may draw image NFTs using the pixel NFTs.

The image drawing NFT video game of the present embodiments allows the players to own all rights to their owned pixel NFTs and the image NFTs that are composed by the pixel NFTs. The rights include but not limited to combining pixel NFTs to generate image NFTs, buying and selling NFTs, transferring NFTs to others, and burning (destroying) NFTs. The present embodiments allow the players to create any image NFTs they want.

The remaining detailed description describes the present embodiments with reference to the drawings. In the drawings, reference numbers label elements of the present embodiments. These reference numbers are reproduced below in connection with the discussion of the corresponding drawing features.

FIG. 1A is a functional block diagram illustrating an example system 100 for an image drawing NFT video game, according to various aspects of the present disclosure. As shown, the system 100 may include a video game platform 112, several electronic devices 120, and a blockchain network 150. The video game platform 112, in some embodiments, may be implemented on one or more electronic devices, such as the video game platform server 115.

Blockchain networks provide a distributed, unchangeable ledger. Blockchain networks may be public, private, or government blockchains. Examples of blockchain networks include Bitcoin, Ethereum, IBM Blockchain, Corda, etc. A blockchain network provides an infrastructure that allows applications to access ledger and smart contract services. Smart contracts may be used to originate transactions, which are transmitted to each node of the blockchain network and recorded on their copy of the ledger.

With reference to FIG. 1A, the blockchain network 150 may be a distributed ledger which is a decentralized network of blockchain nodes 151. Each blockchain node 151 may include at least one server 152 and storage media 153. The nodes 151 of the blockchain network 150 may communicate with each other through one or more networks 103. The network(s) 103 may include the Internet, user's networks (e.g., Wi-Fi, Ethernet, etc.), telecommunication networks (e.g., public switched telephone networks (PSTNs), packet-switched networks, etc.), networks of servers and backend devices, etc.

The blockchain smart contract application 157 may run on any of the blockchain nodes 151. For example, the blockchain smart contract application 157 may run on a virtual machine (VM) implemented on any of the nodes 151. A VM is an emulation (or software implementation) of a particular computer system.

The blockchain smart contract application 157 may be accessed through an application binary interface (ABI), such as the blockchain smart contract ABI 111. An ABI is an interface between two program modules, one of which is often at the level of machine code. The interface is the de facto method for encoding and decoding data into and out of the machine code. For example, in Ethereum blockchain network, programmers may use ABIs to encode Solidity contract calls for the Ethereum virtual machine (EVM). The programmers may use ABIs to read the data out of transactions. An ABI acts as a function selector, defining the specific functions that may be called to a smart contract for execution.

When a player activity comes (for example, a user clicks on a "mint" button), the activity may trigger an ABI call on the video game platform. The ABI call may then execute a corresponding ABI function in the blockchain smart contract application 157. When the function executes, it may emit events. These events are permanently stored on the blockchain. Meanwhile, the video game platform may always listen to the blockchain events and if the corresponding event is emitted, the video game platform may get the results and may display the results to the players.

In the example of the blockchain smart contract application 157 of FIG. 1A, the smart contract application functions mint 154, burn 155, and transfer 156 may be selected by the corresponding mint 121, burn 122, and transfer 123 interfaces of the ABI 111. The ABI 111 encodes the function signatures and variable declarations into information that allows the VM that implements the blockchain smart contract application 157 to know which function is to be executed and what parameters are passed to the function.

The video game platform 112 may communicate with the electronic devices 120 and the blockchain network 150 through the network(s) 103. The electronic devices 120 may provide a user interface (UI) 102 through which the players 101 may play the image drawing NFT video game of the present embodiments.

Figure 1B:
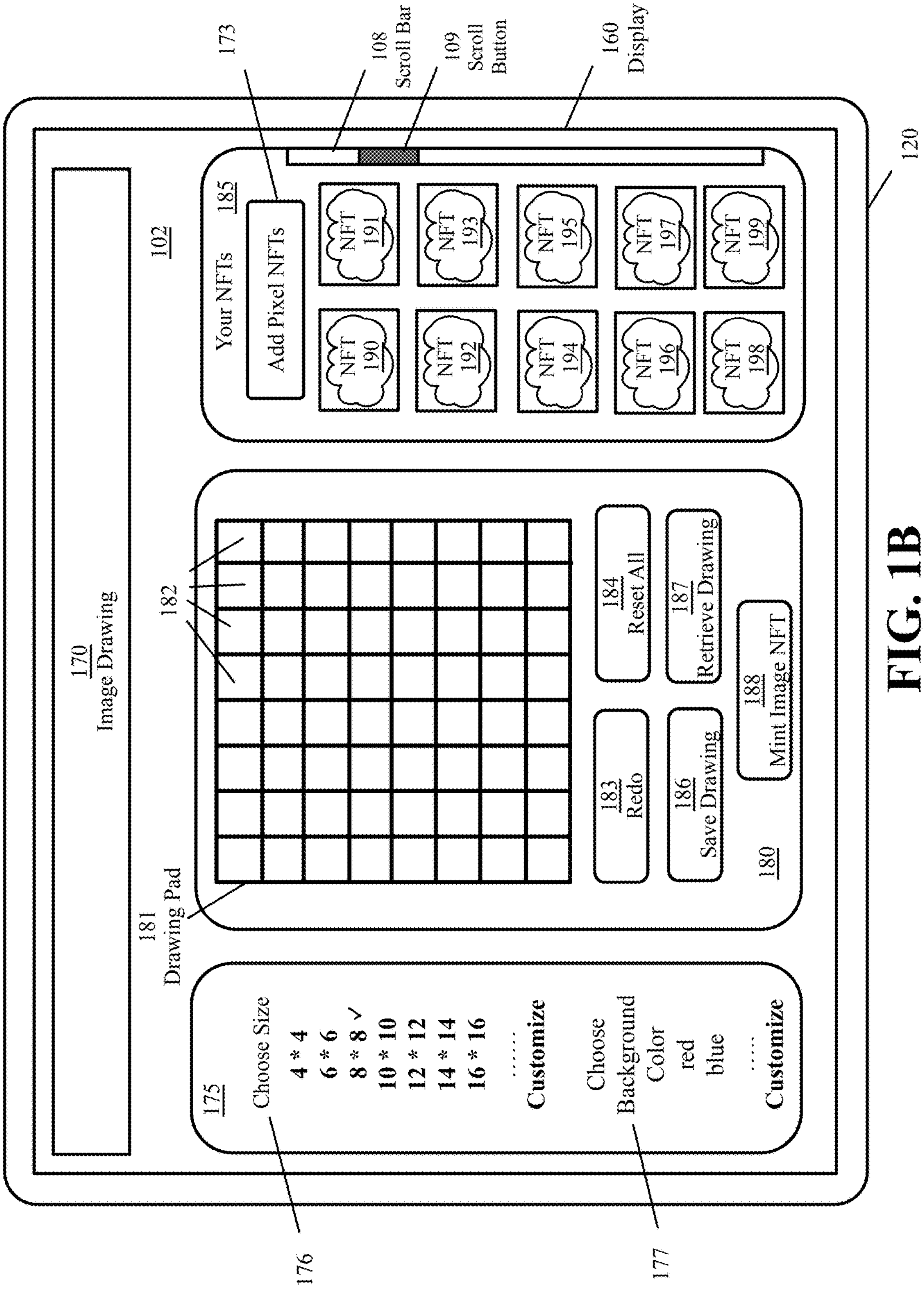
FIG. 1B is a schematic front view of an electronic device with a display that may include a user interface for playing an image drawing NFT video game, according to various aspects of the present disclosure.

FIG. 1B is a schematic front view of an electronic device 120 with a display 160 that may include a UI 102 for playing an image drawing NFT video game, according to various aspects of the present disclosure. The UI 102 may be provided through a web page, an application program (app), and/or other types of programs. The electronic device 120 may be any of the electronic devices 120 of FIG. 1A. The players 101 (FIG. 1A) may use the UI 102 to draw images from the pixel NFTs 190-199 and get image NFTs. Each pixel NFT may be a group of one or more pixels for which an NFT is minted in the blockchain network 150.

With reference to FIG. 1B, the UI 102 may include several display areas including a title area 170, an options area 175, a drawing area 180, and a profile area 185. The options area 175 may provide one or more options 176-177 for selecting different attributes for customizing the game. The options may include, for example, and without limitations, the option 176 for selecting or customizing the size (e.g., the number of pixels in the horizontal and vertical directions) of an image NFT and the option 177 for selecting or customizing the background color of the image NFT.

Figure 2A:
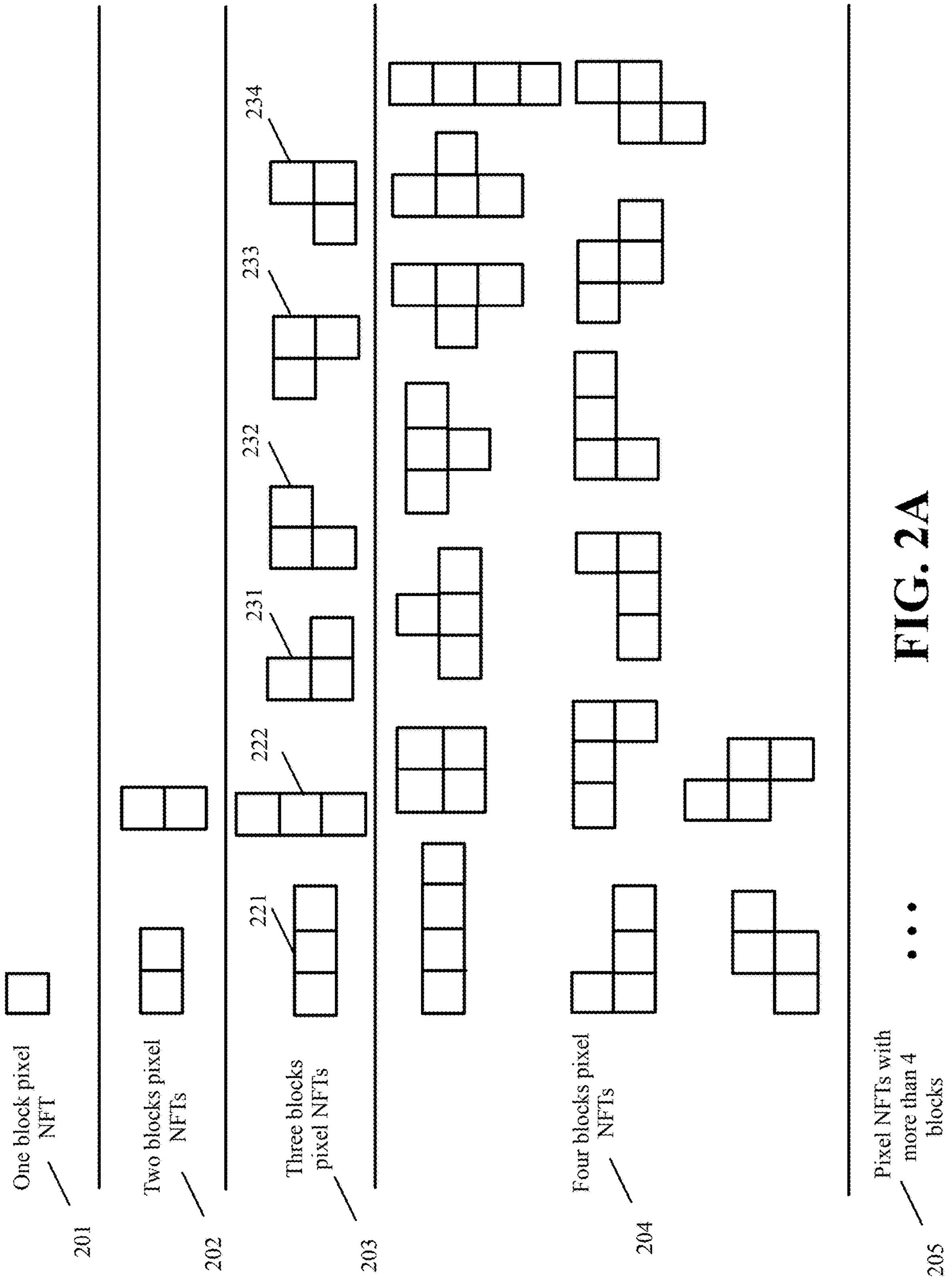
FIG. 2A illustrates examples of the different sizes and different pixel arrangements of the pixel NFTs that a video game platform may provide, according to various aspects of the present disclosure.
Figure 2B:
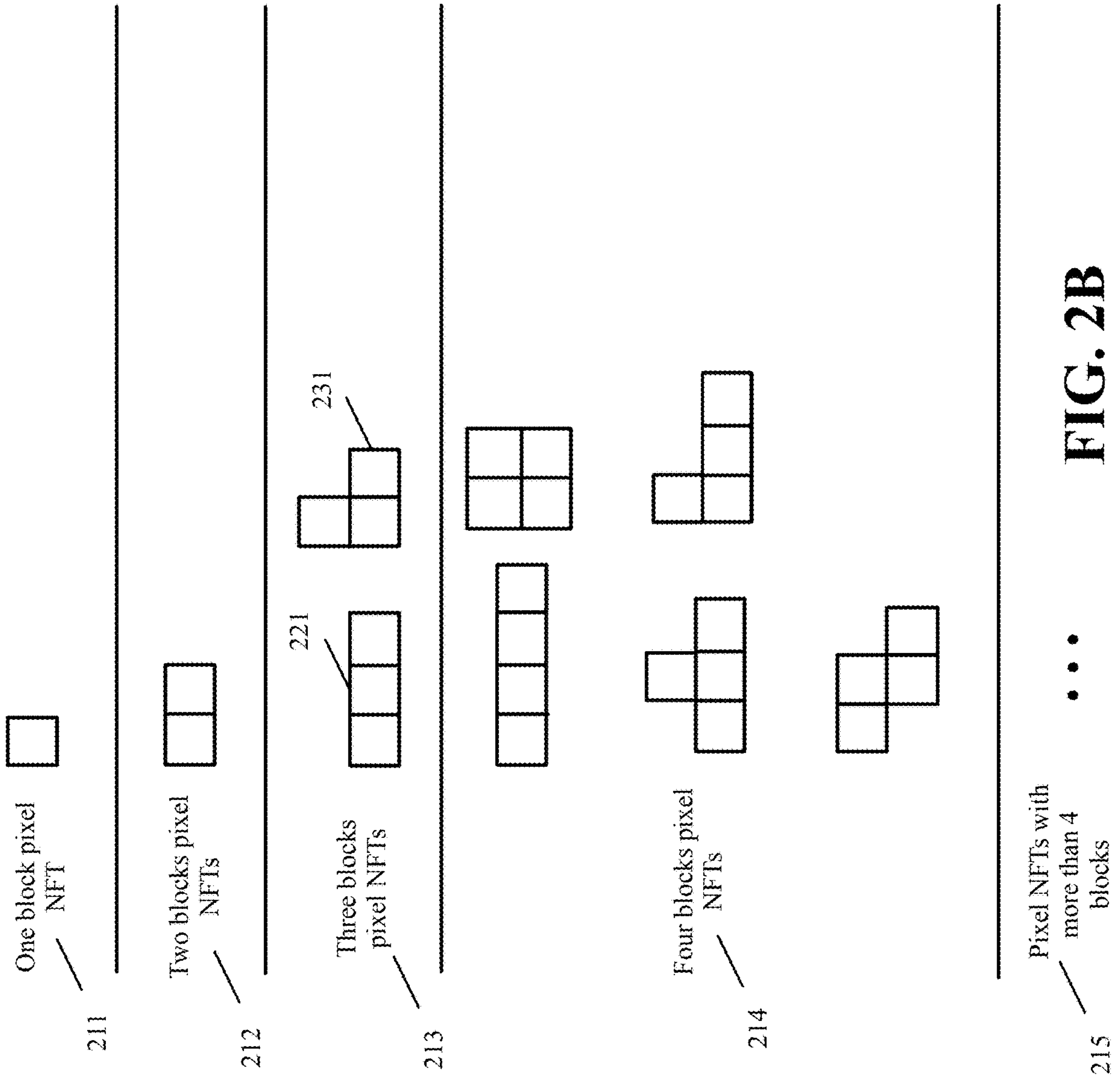
FIG. 2B illustrates examples of the different sizes and different pixel arrangements of the pixel NFTs that the players may select and/or rotate, according to various aspects of the present disclosure.
Figure 3:
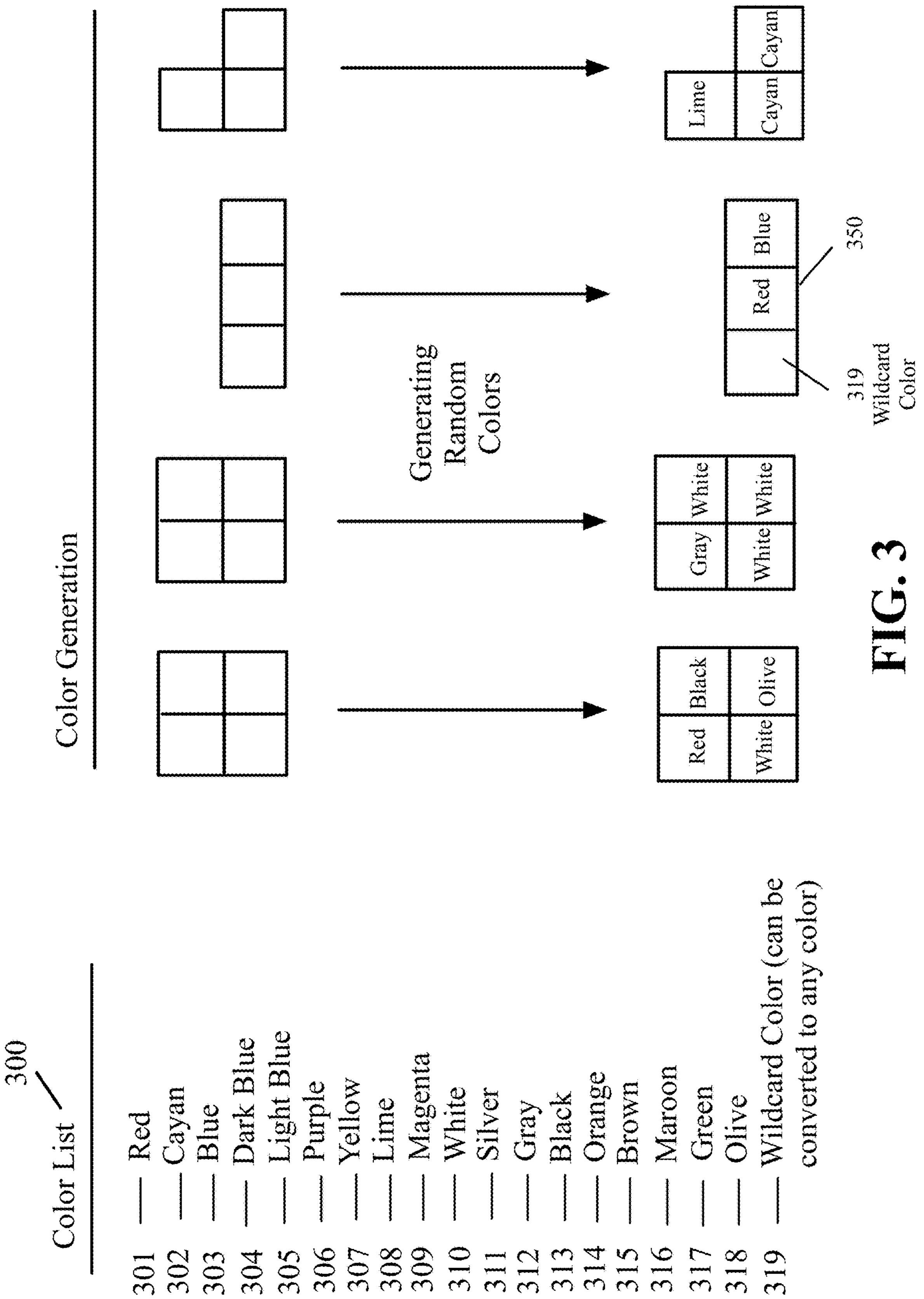
FIG. 3 illustrates examples of different colors that the video game platform may provide, according to various aspects of the present disclosure.

The profile area 185 may display the NFTs owned by a player and may be used by a player (102) to choose the pixel NFTs 190-199 they own to draw an NFT image. It should be noted that the pixel NFTs 190-199 are shown as abstract shapes for simplicity. In operation, the shape, size, and pixel colors of the pixel group associated with each pixel NFT (e.g., as shown in FIGS. 2A-2B and 3) and the identification of the pixel NFT may be displayed in the profile area 185.

The profile area 185 may include a scroll tool with a scroll bar 108 and a scroll button 109 to allow scrolling additional pixel NFTs that are owned by a player into the display area. The UI 102 may also provide an add pixel NFTs option 173 that may allow the player to add pixel NFTs by minting new pixel NFTs or buying existing pixel NFTs. For example, selecting the search option 173 may display the UI 400 of FIG. 4, described below.

As described further below, each pixel NFT 190-199 may include one or more pixels and each pixel may correspond to a color. When a pixel NFT has more than one pixel, the pixels may have the same or different colors. After the size of the NFT image is selected (or customized) using the option 176, some embodiments may draw the drawing pad 181 with dimensions that correspond to the selected (or customized) size. For example, the drawing pad 181 may include several pixel blocks 182 with the number of pixel blocks 182 in the horizontal and vertical directions as specified by the selected (or customized) size. For clarity, only some of the pixel blocks 182 are labelled in FIG. 1B.

Each pixel block 182 may be used to receive a color pixel to draw an image. Selection of a background color using the option 177 may result in all pixel blocks 182 of the drawing pad 181 to initially have the same color pixel as the selected background color.

The player may draw an NFT image by selecting the pixel NFTs 191-199 and move them (e.g., by a drag and drop operation) into the pixel blocks 182 of the drawing pad 180. When the selected pixel NFT includes only one pixel, the corresponding pixel block 182 of the drawing pad 181 may be displayed with the same color as the pixel of the pixel NFT. When the selected pixel NFT has more than one pixel and is moved to an area of the drawing pad 181, the pixel blocks 182 in that area of the drawing pad 181 may be displayed with the corresponding pixel colors of the selected pixel NFT.

The UI 102 may also provide different functions to players, including but not limited to, redoing the previous operation 183, resetting all operations 184, saving the drawing 186, retrieving a drawing 187, and minting 188 the corresponding image NFT. When a player selects the save drawing option 186 and provides a file name (e.g., in response to a pop up message), some embodiments may save the drawing that is made by the player in the drawing pad 181 as a file, such as a JavaScript Object notation (JSON) file, which may include all the information needed to draw the image (the size, the background, the pixel NFTs used to draw the image, and the arrangement of these pixel NFTs). When the player selects the retrieve image option 187 and selects the saved file name (e.g., in response to a pop up message), the image may be drawn and displayed in the drawing pad 181 using the information stored in the file.

In the profile area 185, players may see all their owned pixel NFTs 191-199 and may choose the pixel NFTs that they want to use to draw an image.

It should be noted that the size of the drawing pad 181 and the background colors are not limited to the examples shown in FIG. 1B. In addition, the drawing pad 181, in some embodiments, may not include the same number of rows and columns.

With reference to FIG. 1A, the video game platform 112, in some embodiments, may include one or more functional components that may be implemented by machine-readable instructions. The functional components may include the account component 131, the search component 135, the mint component 132, the market component 133, and the drawing component 134. The video game platform 112 may include the blockchain smart contract ABI 111, described above.

In some embodiments, a player 101 may be required to have a registered account in the game platform 112 to play the game. The account component 131, in some embodiments, may include a sign-up component 141, a login component 142, a connect wallet component 143 and a profile component 144. A player may register an account with the image drawing NFT video game platform 112 through the sign-up component 141. The account may be registered, for example, and without limitations, by providing a username and a password. The players may log in to the platform through the login component 142, for example, and without limitations, by providing their username and password. The players may use the connect wallet component 143 to connect a digital (or crypto) wallet, such as a Web3 wallet. Web3, or Web 3.0, is an iteration of the World Wide Web which incorporates concepts such as decentralization, blockchain technologies, and token-based transactions. A digital wallet may be used to store digital assets, such as NFTs. A digital wallet allows interaction with decentralized applications (or dApps), which are digital applications that run on a blockchain network. Examples of digital wallets include MetaMask, Trust Wallet, and Coinbase Wallet. The players 101 may use their digital wallets to perform subsequent NFT operations. The identification of the NFTs stored in a wallet may be displayed on the UI 102 of the electronic device of the wallet's owner.

With further reference to FIG. 1A, the mint component 132 may be configured to allow the players 101 to mint and receive different pixel NFTs. The market component 133 may include functions that may be configured to allow players buy 145, sell 146, gift 147, or trade 148 different NFTs using the video game platform 112, this includes but not limited to different pixel NFTs and different image NFTs generated by pixel NFTs. The players, in some embodiments, may trade NFTs with the video game platform 112 and/or with other players 101. The drawing component 134 may be configured to allow the players 101 to draw different image NFTs by piecing together different pixel NFTs on the drawing pad 181 (FIG. 1B). Any of the video game platform components may use the blockchain smart contract ABI 111 to communicate with the blockchain smart contract application 157 to perform mint, burn, or transfer operations for different NFTs.

The video game platform 112 of the present embodiments provides the technical advantage of using pixel NFTs that enable the players to create and customize their own images instead of buying and selling the images that are provided by a gaming platform. In contrast, the existing NFT games only allow the players to buy or sell digital assets from existing NFT collections.

The video game platform 112 of the present embodiments further provides the technical advantage of using NFTs to preserve the uniqueness of a digital image regardless of the digital image being copied by others. For example, if a well-known basketball player uses the video game platform 112 of the present embodiments and draw an image of a basketball and the basketball player's signature, the NFT assigned to this drawing preserves the uniqueness and scarcity of the drawing. Even though other persons may copy the same color and the same arrangement of pixels to generate a similar image, the original image is clearly identified as the work of the well-known basketball player.

The drawn image is secured by cryptography and blockchain technology and may be verified and tracked on a public distributed ledger. The image NFT is immune from fraud, theft, or duplication, and may protect the rights and identity of person who drew the image.

FIG. 2A illustrates examples of the different sizes and different pixel arrangements of the pixel NFTs that a video game platform may provide, according to various aspects of the present disclosure. With reference to FIG. 2A, several examples of the pixels NFTs with one pixel (201), with two pixels (202), with three pixels (203), and with four pixels (204) are shown. Some embodiments, provide pixel NFTs with more than 4 pixels (205). As described above, each pixel NFT may be associated with a group of one or more pixels (referred to herein as a pixel group). The group of pixels may include different number of pixels, different colors of pixels (e.g., as described below with reference to FIG. 3), and different shapes (or arrangements) of pixels.

When a player initially joins the game and/or when the player request for a number of pixel NFTs, some embodiments may perform a minting operation to generate one or more-pixel NFTs. During minting, the players may get pixel NFTs with different blocks. For example, a player may get one or more-pixel NFTs with one block, two blocks, three blocks, and/or four blocks, etc. Sizes may be generated with equal weights or with a weighted random algorithm.

Some embodiments may provide a tool to allow players to rotate pixel NFTs. In these embodiments, a pixel NFT shape may be rotated at 90 degrees, 180 degrees, and/or 270 degrees to provide different pixel NFT shapes. FIG. 2B illustrates examples of the different sizes and different pixel arrangements of the pixel NFTs that the players may select and/or rotate, according to various aspects of the present disclosure. With reference to FIG. 2B several example of the pixels NFTs with one pixel (211), with two pixels (212), with three pixels (213), and with four pixels (214) are shown. Some embodiments, provide pixel NFTs with more than 4 pixels (215).

The embodiment of FIG. 2B allows the players to select each shape (e.g., by a pointing tool such as a mouse) and rotate the shape (e.g., by a rotating movement of the mouse or by using a rotate button). The selected shape may then rotate by 90 degrees, 180 degrees, or 270 degrees. For example, the shape 221 of FIG. 2B may be selected and rotated by 90 degrees to result the shape 222 of FIG. 2A. As another example, the shape 231 of FIG. 2B may be selected and rotated by 90, 180, or 270 degrees to result the shapes 232, 233, and 234 of FIG. 2A, respectively.

FIG. 3 illustrates examples of different colors that the video game platform may provide, according to various aspects of the present disclosure. In the embodiment depicted in FIG. 3, the players may get pixel NFTs with any of the different colors, for example, and without limitations, the colors 301-318 shown in a color list, such as the color list 300. The players may also be provided with a wildcard color 319. The wildcard color may be used as any other colors (including, but not limited to, the colors listed in FIG. 3) the players may want. For example, the pixel NFT 350 includes a pixel block with wildcard color 319. The player who owns the pixel NFT 350, may use any of the color 301-318 in the pixel block with wildcard color 319. Some embodiments may allow the player to specify any RGB or CMYK color for the pixel block with wildcard color 319. A pixel NFT with a wildcard color pixel block may become a desirable pixel NFT among the players to buy or trade as it provides the advantage that the player may specify any arbitrary color for the wildcard color pixel block.

It should be noted that, the players may arbitrarily change the color of the wildcard pixels that they own multiple times. However, once the player uses the wildcard color to draw an image, at the minting time, the player has to determine what color the player wants the wildcard pixel to have. After the minting of the image NFT, the color may not be changed. In other words, the image NFTs may not include no wildcard colors because the players have chosen a particular color during the minting of image NFT.

During minting, each pixel of pixel NFTs may be filled by a particular color from the color list 301-319 with equal weights or with a weighted random algorithm. A weighted random algorithm may select an item from a list (such as the items 301-319 of FIG. 3), where the chances of each item to be selected are not equal, but rather defined by relative weights (or probabilities).

Figure 4:
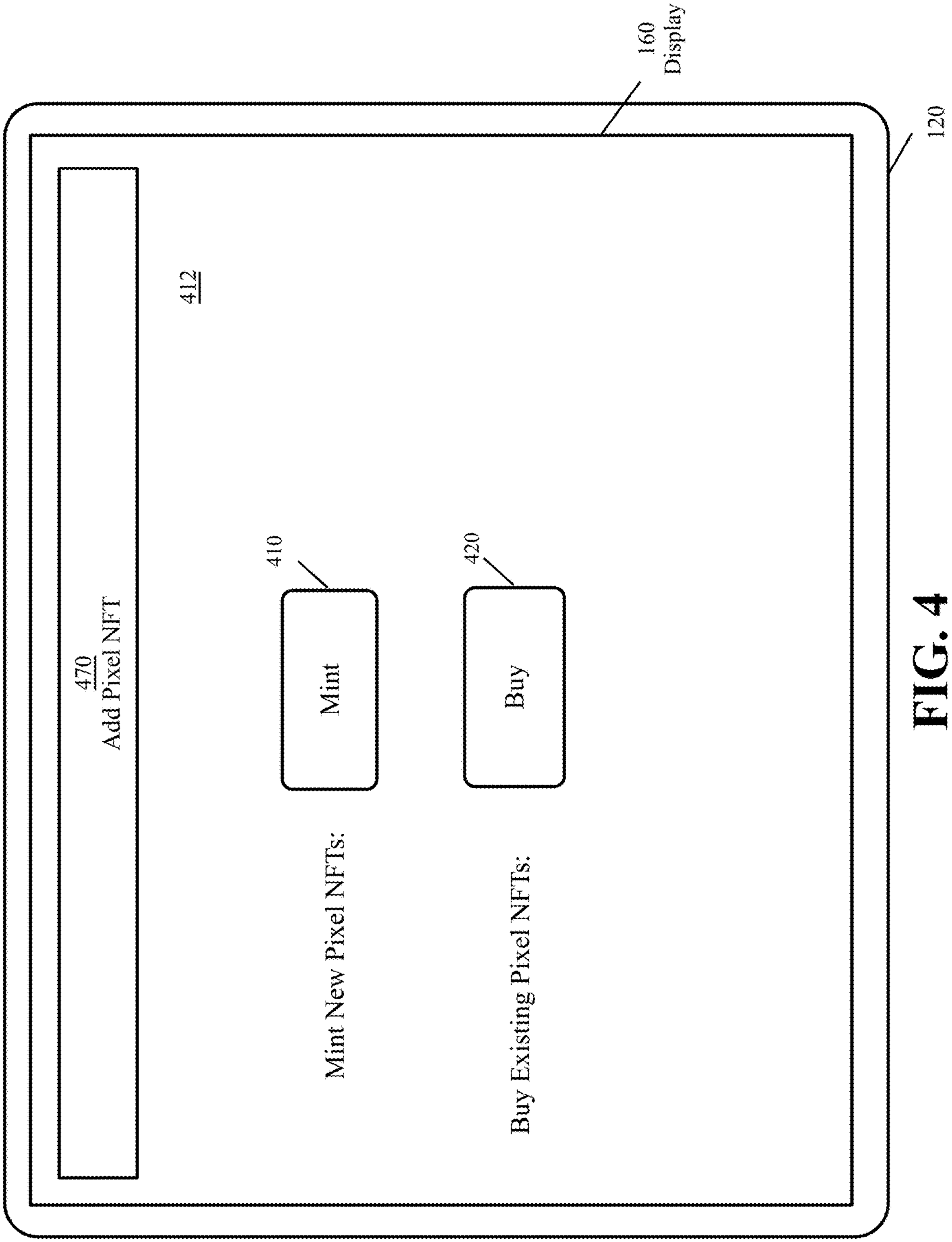
FIG. 4 illustrates a schematic front view of an electronic device with a display that may include a user interface for players to add pixel NFTs by either minting new pixel NFTs or buying existing pixel NFTs, according to various aspects of the present disclosure.

FIG. 4 illustrates a schematic front view of an electronic device 120 with a display 160 that may include a UI 412 for players to add pixel NFTs by either minting new pixel NFTs or buying existing pixel NFTs, according to various aspects of the present disclosure. The electronic device 120 may be any of the electronic devices 120 of FIG. 1A. The UI 412 may be provided through a web page, an app, and/or other types of programs.

With reference to FIG. 4, the UI 412 may be displayed, for example, after a player selects the option 173 of FIG. 1B to add new pixel NFTs to the player's portfolio. The UI 412 may include a title area 470, an option 410 to mint new pixel NFTs, and an option 420 to buy existing pixel NFTs.

Selecting the mint option 410 may display the UI 512 to allow the player mint new pixel NFTs, as described below with reference to FIGS. 5A-5B. Selecting the buy option 420 may display the UI 600 to allow the player search for and buy existing pixel NFTs from the NFT market of the video game platform, as described below with reference to FIG. 6A.

Figure 5A:
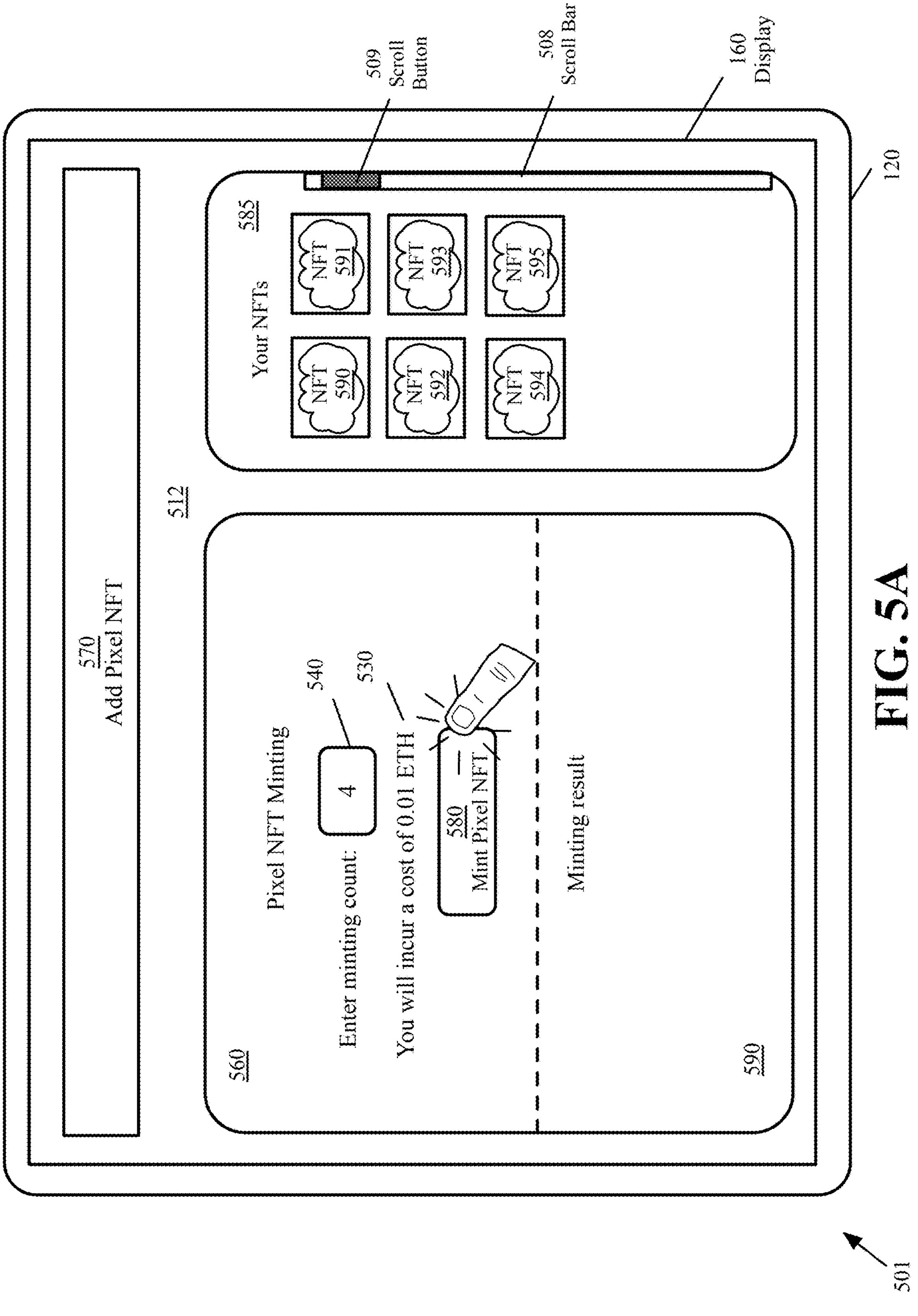
FIGS. 5A-5B illustrate a schematic front view of an electronic device with a display that may include a user interface for minting pixel NFTs, according to various aspects of the present disclosure.
Figure 5B:
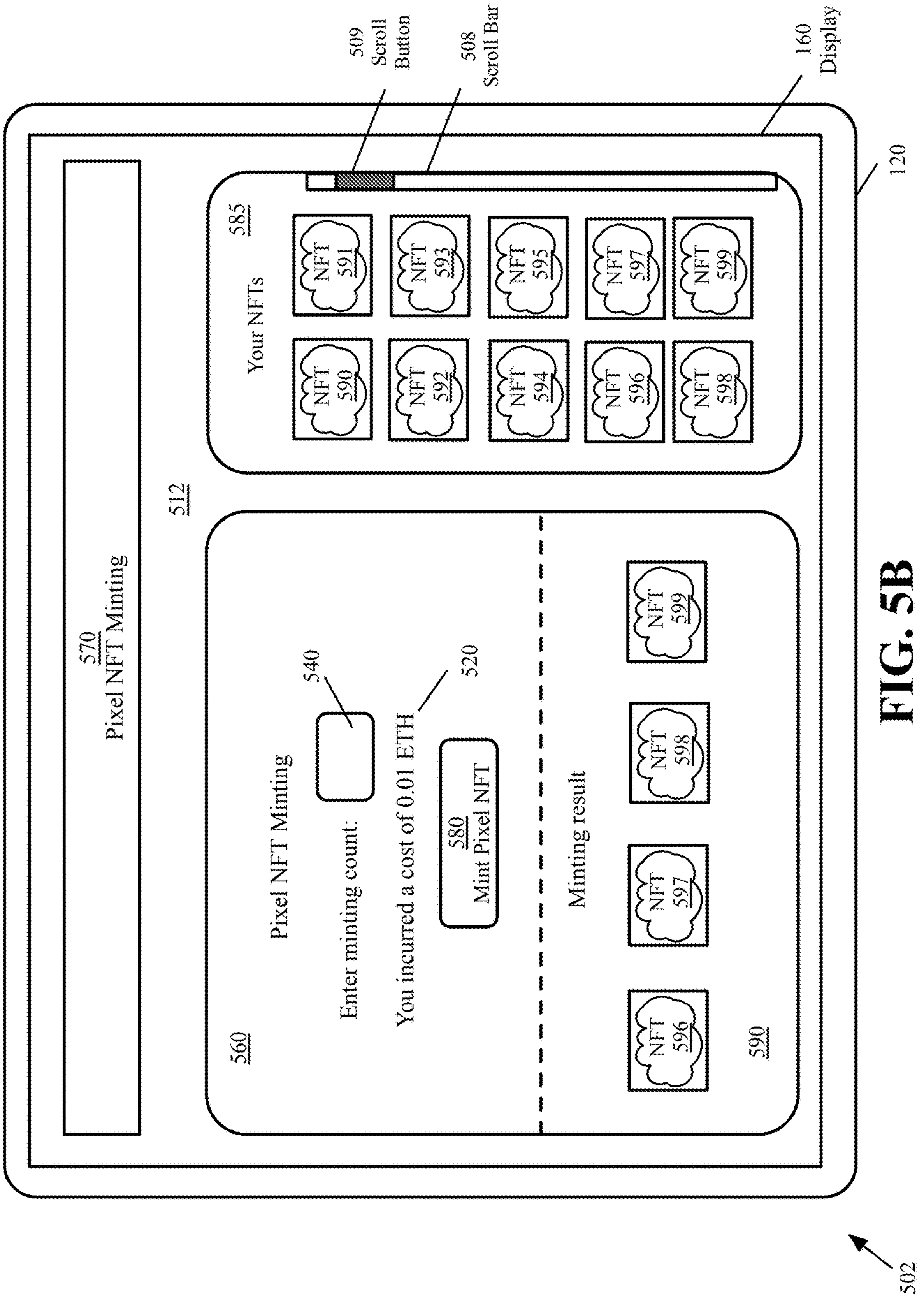

FIGS. 5A-5B illustrate a schematic front view of an electronic device 120 with a display 160 that may include a UI 512 for minting pixel NFTs, according to various aspects of the present disclosure. The electronic device may be any of the electronic devices 120 of FIG. 1A. The players 101 (FIG. 1A) may use the UI 512 to mint pixel NFTs based on different criteria. The UI 512 may be provided through a web page, an app, and/or other types of programs.

With reference to FIGS. 5A-5B, the UI 512 may include several display areas including a title area 570, a pixel NFT minting area 560, a minting result area 590, and a profile area 585. The pixel NFT minting area 560 may provide an area 540 for entering the number of pixel NFTs that the player wants to mint. The pixel NFT minting area 560 may indicate the cost 530 that the player may incur for the requested number of pixel NFTs. The pixel NFT minting area 560 may provide an option 580 to mint the number of pixel NFTs indicated in the area 104. The minting result area 190 may show the minting results. The profile area 585 may display the pixel NFTs 590-595 that the player currently owns. The profile area 585 may include a scroll tool with a scroll bar 508 and a scroll button 509 to allow scrolling additional pixel NFTs that may be owned by the player into the display area.

FIGS. 5A-5B, as shown, include two operational stages 501-502. In stage 501, the minting result area 590 is empty and the player has six pixel NFTs 590-595. As shown, the player has entered a minting count of four pixel NFTs in the area 540 and the UI 512 displays (as shown by 530) the cost to mint four pixel NFTs. The player, in stage 501, may select the option 580 to mint pixel NFTs. Some embodiments may require the player to confirm minting, for example, by providing a digital signature through a digital wallet.

Once the player confirms minting, the mint ABI 121 (FIG. 1A) may be called by the mint component 132 of the video game platform 112. The mint ABI 121 may then send a minting request to the mint function 154 of the blockchain smart contract application 157. The mint function 154 of the blockchain smart contract application 157 may execute the code for minting the pixel NFTs on the blockchain network 550 and may return the minting results to the mint component 132 of the video game platform 112 through the mint ABI 121.

As shown in stage 502, 4-pixel NFTs 596-599 may be minted for the player. The minted pixel NFTs 596-599 may be displayed in the profile area 585. The UI 512 may display the cost 520 incurred by the player and may clear the area 540 for the next minting operation. It should be noted that the players, in some embodiments, cannot choose the size, shape, and/or color of the minted pixel NFTs. Some embodiments may select the size, the shape, and the pixel(s) color(s) of a minted pixel NFT from corresponding lists of sizes, shapes, and pixel colors by using equal weights and/or a weighted random algorithm.

Figure 6A:
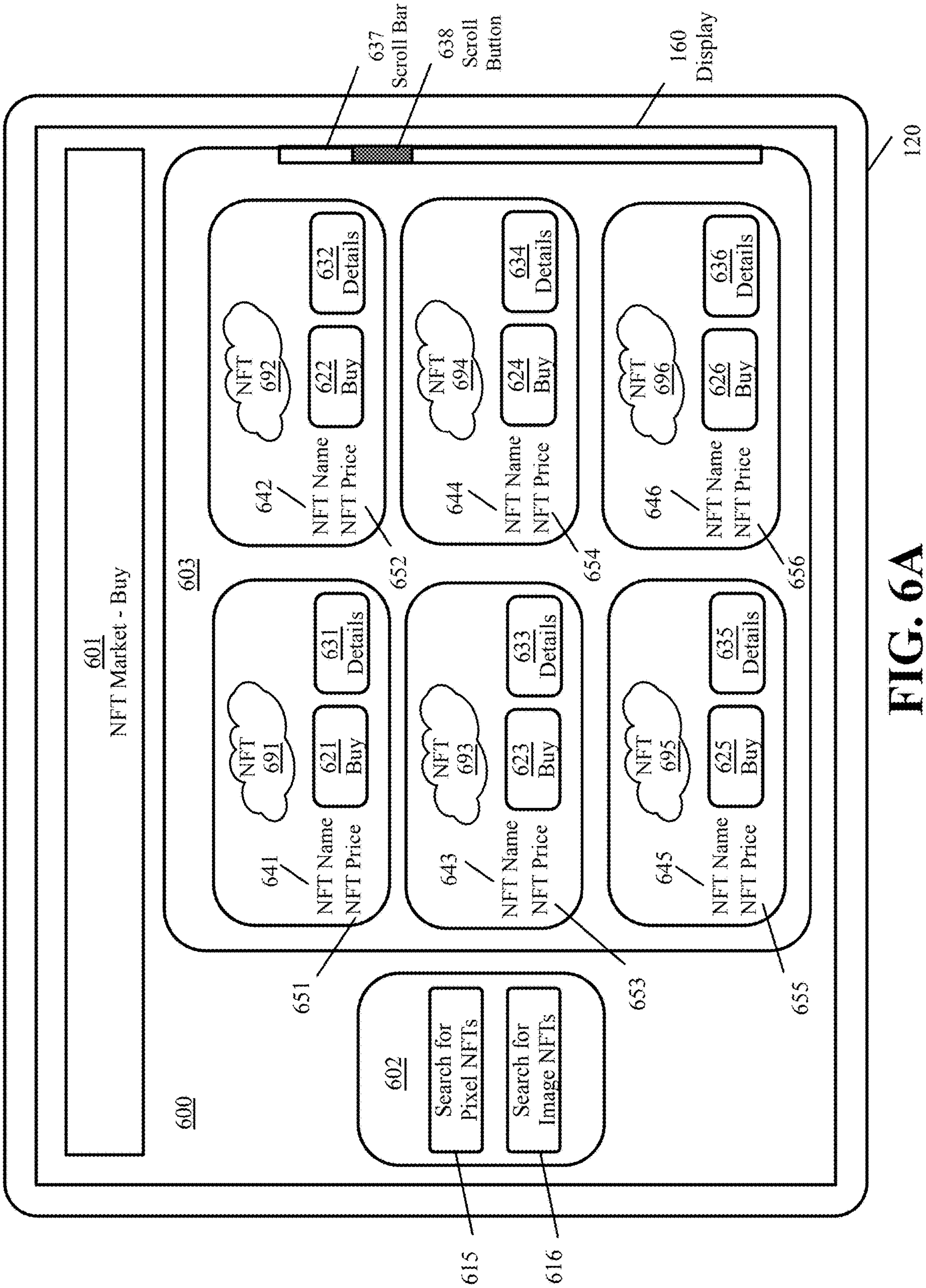
FIG. 6A is a schematic front view of an electronic device with a display that may include a UI for the players to buy pixel NFTs or image NFTs, according to various aspects of the present disclosure.

The players, in some of the present embodiments, may buy or sell the pixel NFTs and the image NFTs. FIG. 6A is a schematic front view of an electronic device 120 with a display 160 that may include a UI 600 for the players to buy pixel NFTs or image NFTs, according to various aspects of the present disclosure. The electronic device 120 may be any of the electronic devices 120 of FIG. 1A. The UI 600 may be provided through a web page, an app, and/or other types of programs.

With reference to FIG. 6A, the UI 600 may be displayed, for example, when the option 420 of FIG. 4 is selected to buy existing pixel NFTs. The UI 600 may also be displayed, for example, when a player wants to buy existing image NFTs. The UI 600 may include a title area 601, a searching area 602, and a result area 603. The searching area 602 may provide an option 615 to search for different pixel NFTs (e.g., as described below with reference to FIGS. 7A-7B) and an option 616 to search for different image NFTs.

The result area 603 may display the NFTs 691-696 that satisfy a search criteria after selecting options 615 or 616. The result area 603 may include a scroll tool with a scroll bar 637 and a scroll button 638 to allow scrolling additional NFTs that satisfy the search criteria into the display area. The UI 600 may display the names 641-646 and the prices 651-656 of the NFTs 691-696, respectively. The prices may be the native tokens of a blockchain network or a fiat currency that may be converted to the native token of the blockchain network.

The UI 600 may provide the selectable options 621-626 to buy the NFTs 691-696, respectively. The UI 600 may provide the selectable options 631-636 to display the details of the NFTs 691-696, respectively.

Figure 6B:
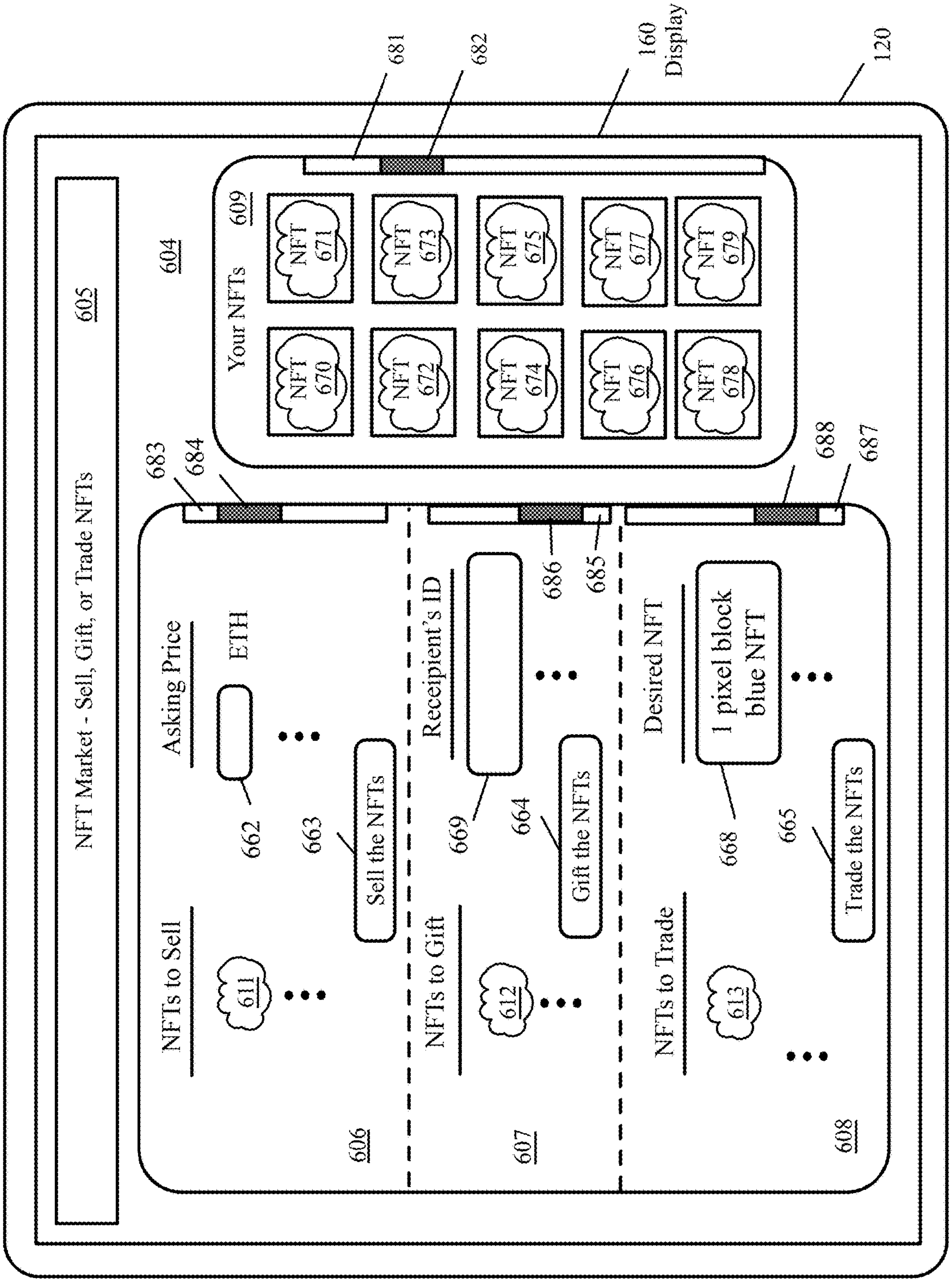
FIG. 6B is a schematic front view of an electronic device with a display that may include a UI for the players to sell, gift, or trade their pixel NFTs or image NFTs, according to various aspects of the present disclosure.

FIG. 6B is a schematic front view of an electronic device 120 with a display 160 that may include a UI 604 for the players to sell, gift, or trade their pixel NFTs or image NFTs, according to various aspects of the present disclosure. The electronic device 120 may be any of the electronic devices 120 of FIG. 1A. The UI 604 may be provided through a web page, an app, and/or other types of programs.

With reference to FIG. 6B, the UI 604 may be displayed, for example, when a player wants to sell, gift, or trade the player's pixel or image NFTs. The UI 604 may include several display areas including a title area 605, a sell area 606, a gift area 607, a trade area 608, and a profile area 609.

The profile area 609 may display the NFTs owned by a player and may be used by the player to select the pixel NFTs 670-679 they want to sell, gift, or trade. The player may move any of the NFTs between the profile area 609 (e.g., and without limitations, with a drag and drop operation) and any of the display areas 606-608. The profile area 609 may include a scroll tool with a scroll bar 681 and a scroll button 682 to allow scrolling additional NFTs that the player may own into the display area 609.

The player may include one or more NFTs (e.g., the NFT 611, as shown) in the sell area 606 and may enter an asking price in a corresponding display area 662 for each NFT. The sell area 606 may include a scroll tool with a scroll bar 683 and a scroll button 684 to allow scrolling additional NFTs that the player may want to sell into the display area 606. The player may select the option 663 to sell the NFTs that are listed in the display area 606. After the option 663 is selected, the video game platform may provide the NFTs in the display area 606 in the results of searches by other players who may want to buy or trade NFTs (e.g., as described with reference to FIGS. 6A and 7A-7B).

The player may include one or more NFTs (e.g., the NFT 612, as shown) in the gift area 607 and may enter a recipient's identification (ID) in a corresponding display area 669 for each NFT. The recipient's ID may be, for example, and without limitation, a unique address that is assigned to each player. The unique address, in some embodiments, may only be generated by the video game platform 112 and/or by the blockchain network 150. A non-limiting example of such a unique address is an Ethereum (ETH) address, such as, 0x3766328CA1FE4feAc2081942Bbc0C6f054426483, where 0x denotes a hexadecimal number. The recipient's ID may also be a nickname the recipient is using to play the video game. The video game platform may automatically convert the players nicknames into unique addresses during NFT transactions.

The gift area 607 may include a scroll tool with a scroll bar 685 and a scroll button 686 to allow scrolling additional NFTs that the player may want to gift into the display area 607. The player may select the option 664 to gift the NFTs that are listed in the display area 607 to the corresponding recipients. After the option 664 is selected, the NFTs in the display area 607 may be assigned to the corresponding recipients.

The player may include one or more NFTs (e.g., the NFT 613, as shown) in the trade area 608 and may enter a description in a corresponding display area 668 to specify what type of NFT (or NFTs) the player may wish to receive in a trade. The trade area 607 may include a scroll tool with a scroll bar 687 and a scroll button 688 to allow scrolling additional NFTs that the player may want to gift into the display area 607. The player may select the option 665 to trade the NFTs that are listed in the display area 608. After the option 665 is selected, the NFTs in the display area 608 may appear in searches by other players who may want to trade NFTs (e.g., similar to what is described with reference to FIGS. 6A and 7A-7B).

Figure 7A:
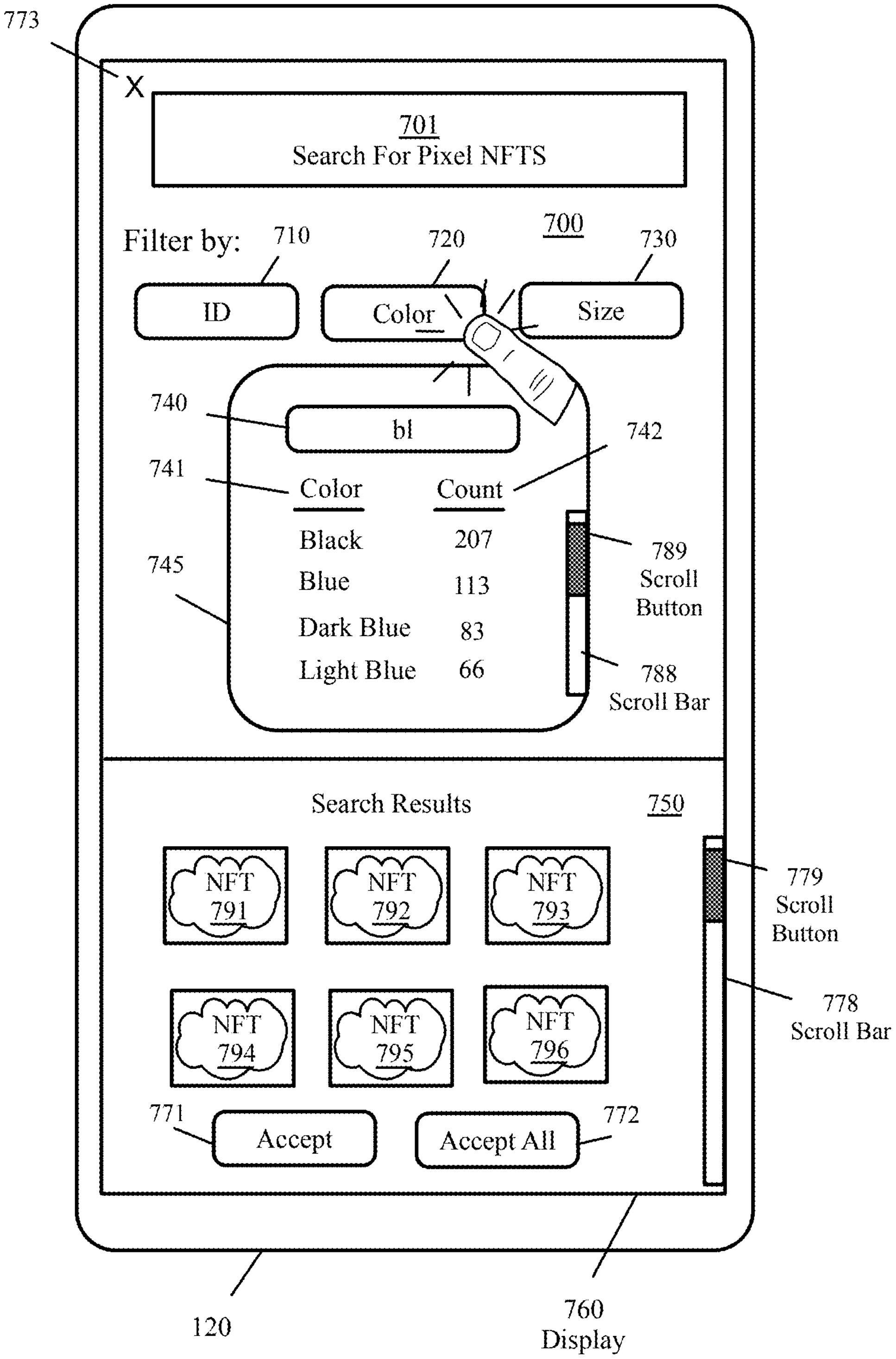
FIGS. 7A-7B illustrate a schematic front view of an electronic device with a display that may include a UI for the players to search for pixel NFTs, according to various aspects of the present disclosure.
Figure 7B:
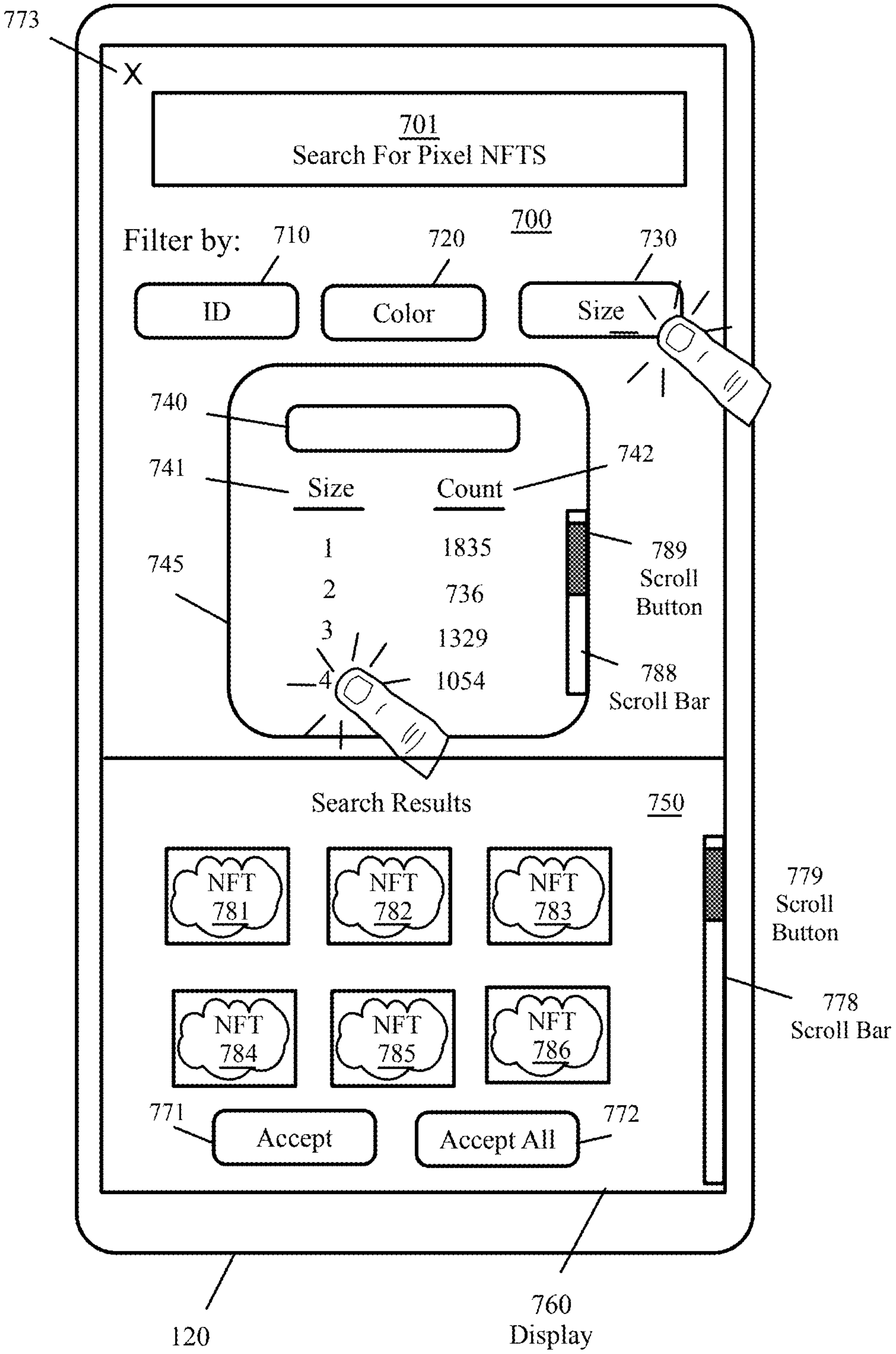
Figure 8A:
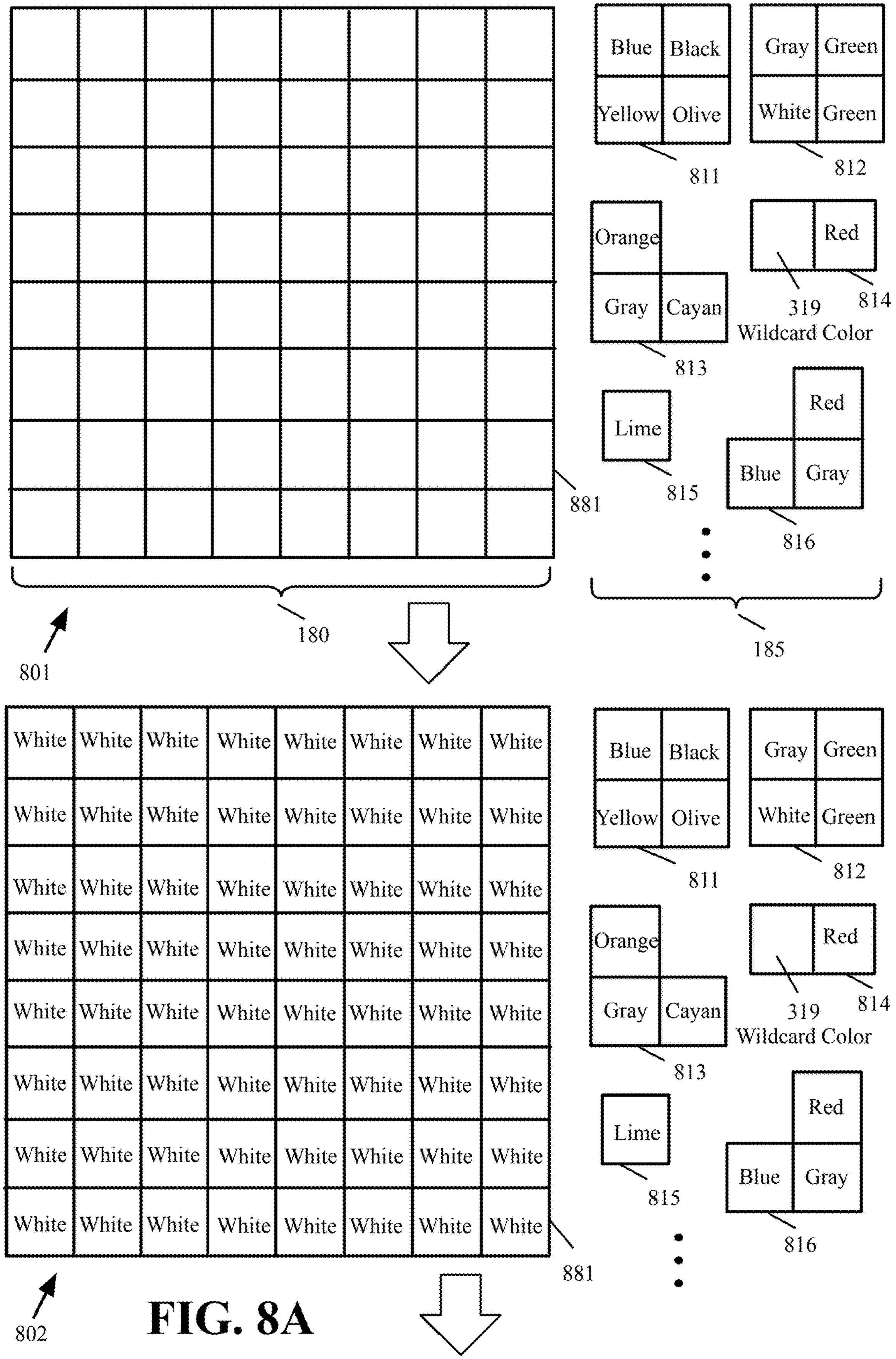
FIGS. 8A-8E illustrate an example procedure of how a player may use the pixel NFTs to draw an image NFT, according to various aspects of the present disclosure.
Figure 8B:
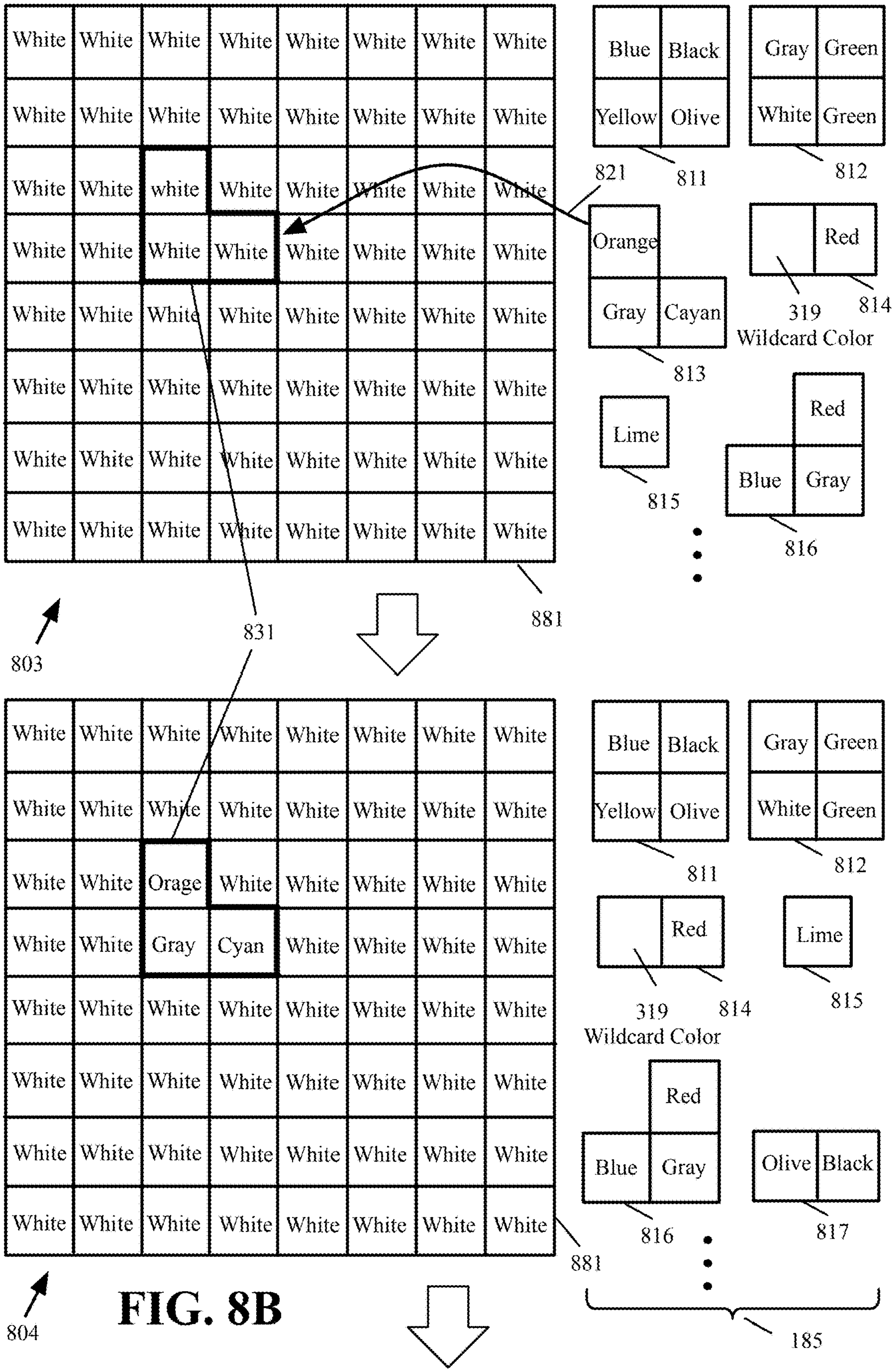
Figure 8C:
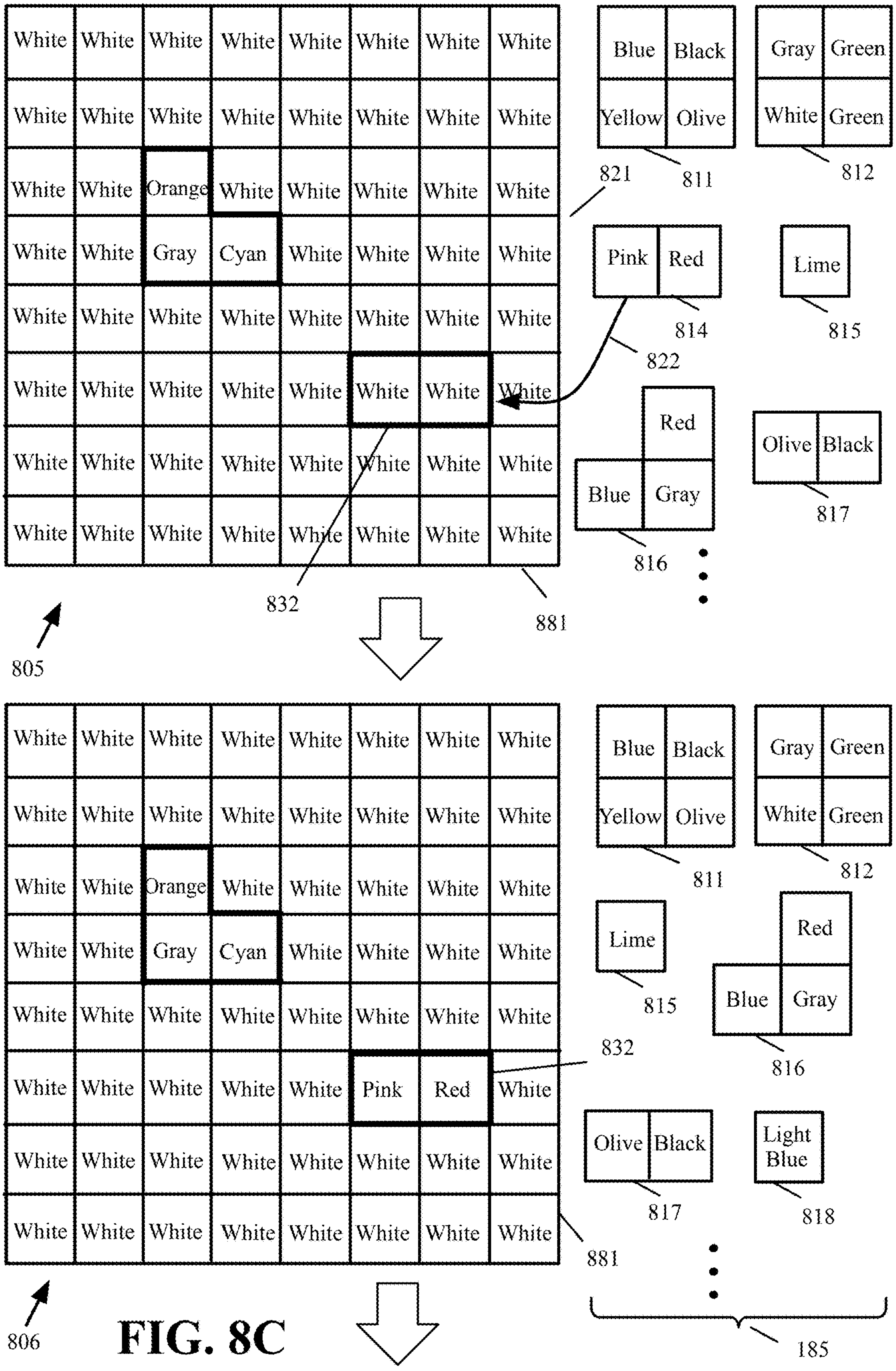
Figure 8D:
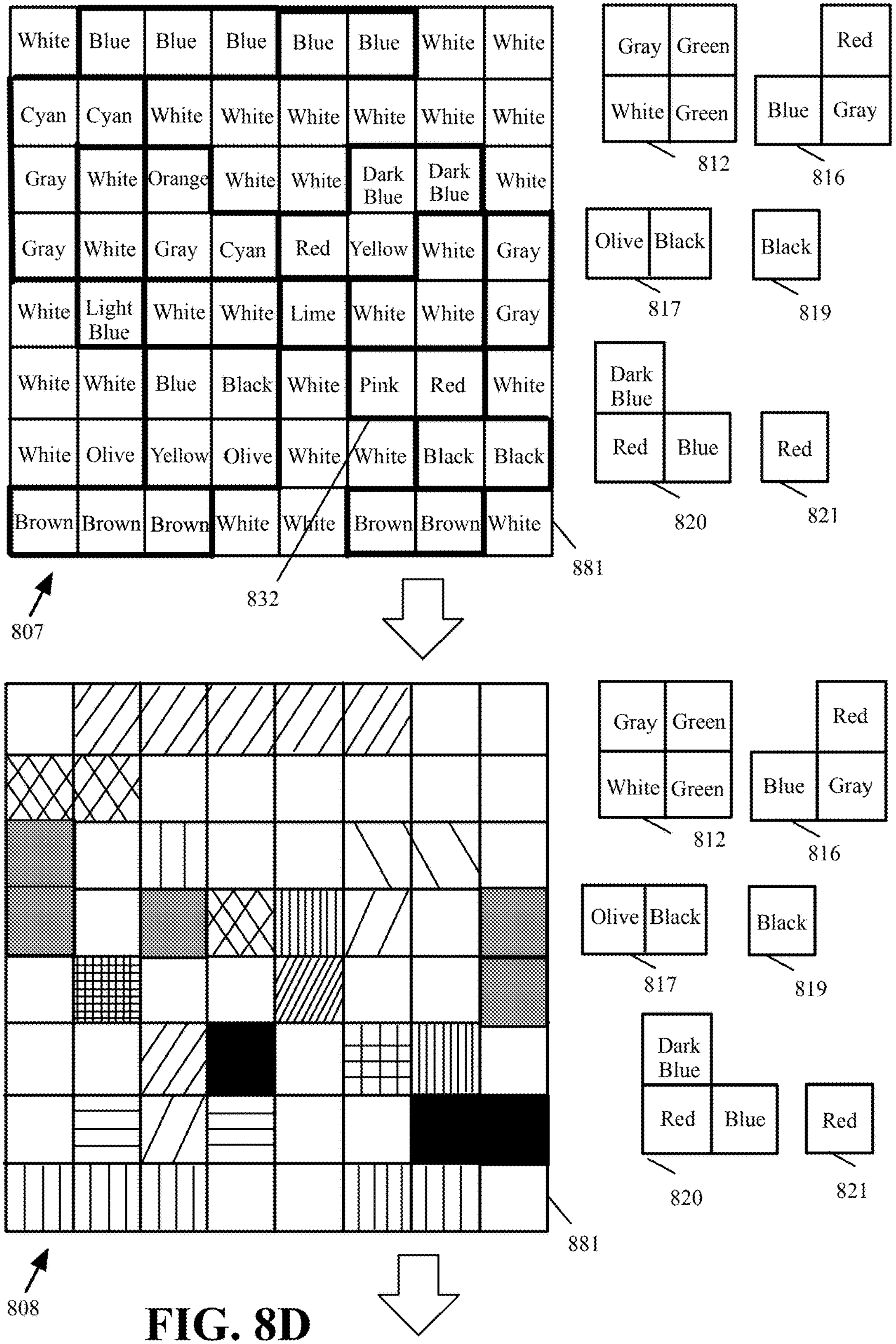
Figure 8E:
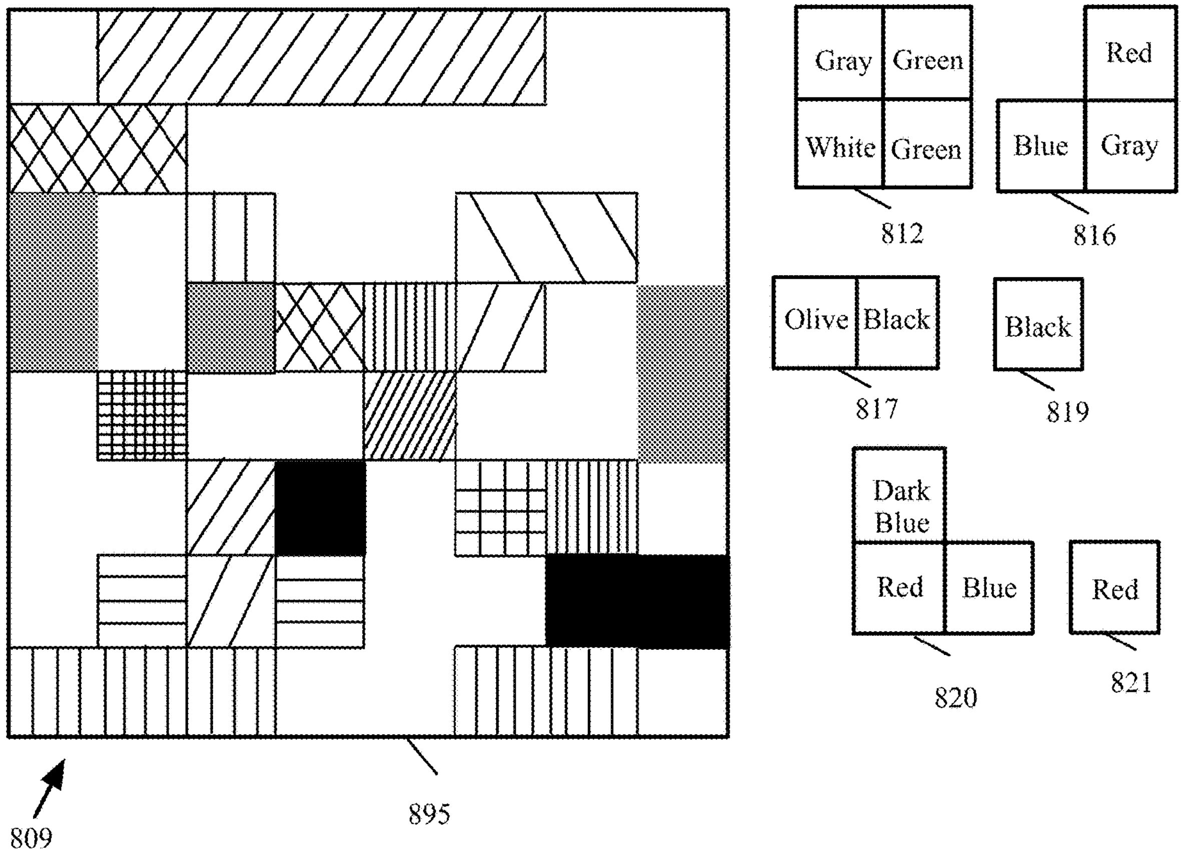

FIGS. 7A-7B illustrate a schematic front view of an electronic device 120 with a display 160 that may include a UI 700 for the players to search for pixel NFTs, according to various aspects of the present disclosure. The electronic device may be any of the electronic devices 120 of FIG. 1A. The UI 700 may be provided through a web page, an app, and/or other types of programs.

With reference to FIG. 7, the UI 700 may be displayed as a pop up when the search for pixel NFT option 615 of FIG.

6A is selected. The UI 700 may include a title area 701, an option 710 to search for pixel NFTs by their identifications, an option 720 to search for pixel NFTs by color, an option 730 to search for pixel NFTs by size, a search criteria area 740, a search summary area 745, and a search results area 750. The option 710 may allow the player to enter the identification of a pixel NFT in the search criteria area 740. For example, a player may have previously seen a particular pixel NFT with a desirable size and pixel colors. The player may have saved the pixel NFT's identification and may search for the pixel NFT using the option 710.

As shown in FIG. 7A, the player has entered a few characters of a search criteria (in this example the string "bl") in the search criteria area 740 and has selected the option 720 to search for pixel NFTs by color. In response, the search summary area 745 may display the pixel colors 741 that satisfy the search criteria (in this example black, blue, dark blue, and light blue) are displayed in the search results area 750. The number of pixel NFTs 742 that satisfy the search criteria may also be displayed. The search summary area 750 may include a scroll tool with a scroll bar 788 and a scroll button 789 to allow scrolling additional search summary that satisfy the search criteria into the search summary area 745.

The search results area 750 may display the pixel NFTs 791-796 that satisfy the search criteria. The search results area 750 may include a scroll tool with a scroll bar 778 and a scroll button 779 to allow scrolling additional NFTs that satisfy the search criteria into the search results area 750.

In some embodiments, when a pixel NFT with n pixels (with n greater than or equal to 1) has at least one pixel with a color that satisfies the search criteria, the pixel NFT is identified as a pixel NFT that satisfies the search criteria. The pixel NFTs that satisfy the search criteria may be returned to the UI that has activated the pop-up UI 700. For example, the pixel NFTs 791-796 may be individually selected (e.g., by a selection action of a pointing device, such as a left click of a mouse) followed by the selection of the accept button 771. In response, the selected NFTs may be displayed in the result area 603 of the UI 600 of FIG. 6A. Alternatively, all NFTs 791-796 may be returned to the UI that has activated the pop-up UI 700 by selecting the accept all option 772. The player may also select a return option, such as the option 773 to close the pop-up UI 700 without returning any of the search results.

With reference to FIG. 7B, the player has selected the option 730 to search for pixel NFTs by size. In response, the pixel sizes 743 and the number 744 of pixel NFTs for each size may be displayed in the search summary area 745. When the player selects one of the sizes (in this example 4), the pixel NFTs 781-786 with the selected size may be displayed in search results area 750. The scroll bars 778 and 788, the scroll buttons 779 and 789, and the options 771-773 may function as described with reference to FIG. 7A.

FIGS. 8A-8E illustrate an example procedure of how a player may use the pixel NFTs to draw an image NFT, according to various aspects of the present disclosure. The figures show a portion of the drawing area 180 and a portion of the profile area 185 of the UI 102 of FIG. 1B.

FIGS. 8A-8E, as shown, include nine operational stages 801-809. In stage 801, a player has started an image drawing game with an 8 pixel by 8 pixel drawing pad 881, for example, after the player has selected 8*8 size using the option 176 of FIG. 1B. The pixel blocks of the drawing pad 881 may initially be empty (i.e., may not include any color pixels).

The player, in stage 801, may be assigned several pixel NFTs, some of which, namely the pixel NFTs 811-816 are shown in the figure. The pixel NFTs 811-816 may have been randomly minted for the player. In addition to, or in lieu of, the minted pixel blocks, the player may have searched (e.g., by using the search for pixel NFTs option 615 of FIG. 6A and the options 710-730 of FIGS. 7A-7B) for any number of pixel NFTs with specific size and pixel color and may have bought one or more of the pixel NFTs from other players or from the video game platform 112 (FIG. 1A).

In stage 802, the player may have selected a background color, such as white, for example by using the option 177 of FIG. 1B. In response, the white pixel may be moved to the pixel blocks of the drawing pad 881. After selecting a background color and minting, buying, or trading some pixel NFTs, the player may use the pixel NFTs the player has to generate an image in the drawing pad 881.

In stage 803, the player may have moved (e.g., by drag and drop) the pixel NFT 813 into an area 831 of the drawing pad 881, as shown by the arrow 821. In response, the pixel blocks of the pixel NFT 813, in stage 804, have replaced the pixel blocks in the area 831. The pixel NFT 813 is removed from the profile area of the player and another pixel NFT 817 that the player owns is shown in the profile area 185.

In stage 805, the player may have assigned a customized RGB or CMYK color. In this example, the player has assigned the hexadecimal RGB value of FFCOCB to the wildcard color 319 of the pixel block 814 to generate a pick color, which is not among the colors 301-318 (FIG. 3) that the particular embodiment of the game provides to the players. In stage 805, the player has moved (e.g., by drag and drop) the pixel NFT 814 into an area 832 of the drawing pad 881, as shown by the arrow 822. In response, the pixel blocks of the pixel NFT 814, in stage 806, have replaced the pixels in the pixel blocks of the area 832. The pixel NFT 814 is removed from the profile area 185 of the player and another pixel NFT 818 that the player owns is shown in the profile area 185.

Stage 807 shows the drawing pad 881 after the player has moved several other pixel NFTs that the player owns into different areas of the drawing pad 881. The pixel NFTs that are used in the image drawn in the drawing pad 881 are removed from the profile area 185, and the profile area 185 shows additional pixel NFTs 819-820 that the player owns. In stage 807, the player may have selected the Save Drawing option 186 of FIG. 1B.

In response, an image 890 may be generated in stage 808 from the pixel NFTs and the background colors (if any) of the pixel blocks of the drawing pad 881. In stage 808, the player may select the Mint Image NFT option 188 of FIG. 1B. After the player confirms the minting, an image NFT 895 may be minted for the player in stage 809.

When an image NFT is minted, the pixel NFTs that are used to draw the image NFT are burned (e.g., destroyed) and are not available to the player anymore. For example, the selection of the Mint Image NFT option 188 may trigger the mint ABI 121 (FIG. 1A). The mint ABI 121 may then execute the mint function of the mint function 154 of the blockchain smart contract application 157. After the mint function is successfully completed, then the burn ABI 122 may be triggered, which may execute the burn function 155 of the blockchain smart contract application 157 to burn the pixel NFTs that are used in the image NFT.

In some embodiments, the blockchain smart contract ABI 111 may include a draw ABI (not shown). Triggering the draw ABI, in these embodiments, may perform a mint image NFT operation followed by a burn pixel NFTs operation after the successful completion of the mint image NFT operation.

The NFT video game platform of the present embodiments provides the technical advantage of using NFTs to represent the pixels used for drawing, and the images that are drawn in the game. As such, the players are given full ownership and control over their digital assets. Unlike traditional video images, which are often bound to a specific platform or account, the pixel and image NFTs are stored on the blockchain and may be transferred, sold, or traded across different games and platforms. The pixel and the image NFTs of the present embodiments may be compatible with various devices, platforms, and networks.

Figure 9:
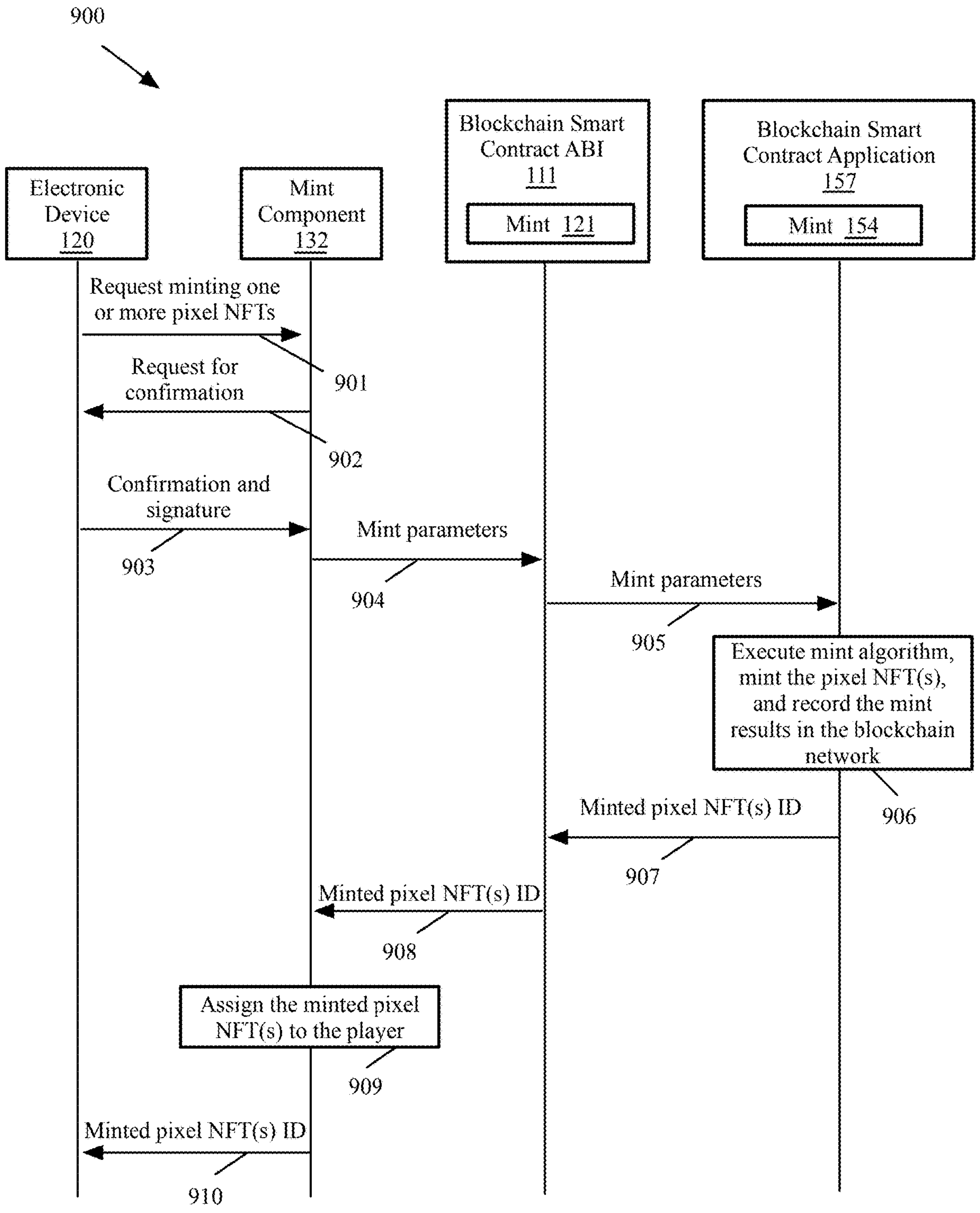
FIG. 9 is an example sequence diagram illustrating message flows and operations performed when players mint pixel NFTs from the video game platform, according to various aspects of the present disclosure.

FIG. 9 is an example sequence diagram 900 illustrating message flows and operations performed when players mint pixel NFTs from the video game platform, according to various aspects of the present disclosure. With reference to FIG. 9, the electronic device 120 of a player may send (at step 901) a request for minting one or more-pixel NFTs to the mint component 132 of the video game platform 112 (FIG. 1A). For example, the request may be sent when the option 580 of FIG. 5A is selected to mint pixel NFTs. Alternatively, the request may be sent when a player initially registers for playing the game.

The mint component 132 may send (at step 902) a request for confirmation to the electronic device 120. The mint component 132 may receive (at step 903) a confirmation and digital signature (e.g., through a digital wallet) form the electronic device 120.

The mint component 132 may then call (at step 904) the mint interface 121 of the blockchain smart contract ABI 111 and may pass the mint parameters to the blockchain smart contract ABI 111. The mint parameters may include the number of pixel NFTs to mint (e.g., as indicated in the display area 540 of FIG. 5A). In some embodiments, other attributes of a pixel NFT, such as the color, shape, and number of pixel blocks may be randomly generated by the video game platform 112.

At step 905 of FIG. 9, the mint interface 121 of the blockchain smart contract ABI 111 may pass the mint parameters to the mint function 154 of the blockchain smart contract application 157. The mint function 154 of the blockchain smart contract application 157 may execute (at block 906) a mint algorithm, mint the pixel NFT(s), and record the mint results in the blockchain network. In some embodiments, the attributes of a pixel NFT, such as color, shape, and number of pixel blocks may be randomly generated by the video game platform 112.

The mint function 154 of the blockchain smart contract application 157 may fill each pixel of the minted pixel NFTs by a particular color from a color list (e.g., the color list 300 shown in FIG. 3) with equal weights or with a weighted random algorithm. The mint function 154 may also determine other attributes of a minted pixel NFT, such as the number of pixel blocks and the shape (e.g., the arrangement of the pixel blocks) of the minted pixel NFT by using similar weights for each shape or each number of pixel blocks, or by using a weighted random algorithm. The mint function 154 may store metadata describing different properties of the minted pixel NFT(s) (e.g., the number of pixel blocks, the color of each pixel block including whether the color is wildcard, and the shape of the pixel NFT) in the blockchain network.

The mint function 154 of the blockchain smart contract application 157 may return (at step 907) the pixel NFT ID to the mint interface 121 of the blockchain smart contract ABI 111. The pixel NFT ID may be a unique address generated by the blockchain network and/or the video gaming platform, as described above with reference to item 669 of FIG. 6B.

The mint interface 121 of the blockchain smart contract ABI 111 may send (at step 908) the minted pixel NFT(s) ID(s) to the mint component 132 of the video game platform. The mint component 132 of the video game platform may assign (at block 909) the minted pixel NFT(s) to the player. The mint component 132 may send (at step 910) the minted pixel NFT(s) IDs to the electronic device 120 of the player.

Figure 10:
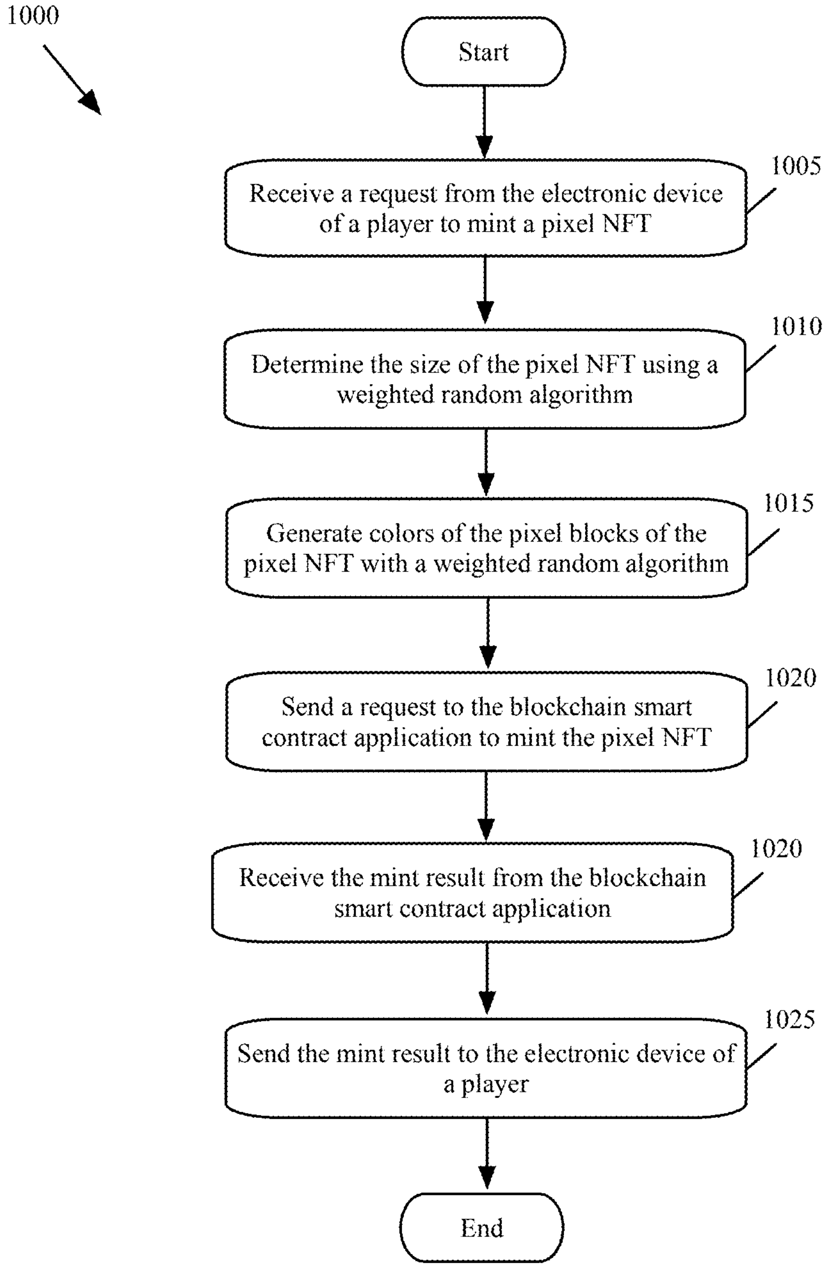
FIG. 10 is a flowchart illustrating an example process for minting a pixel NFT, according to various aspects of the present disclosure.

FIG. 10 is a flowchart illustrating an example process 1000 for minting a pixel NFT, according to various aspects of the present disclosure. The process 1000, in some of the present embodiments, may be performed by a processor of the video game platform 112 of FIG. 1A.

With reference to FIG. 10, a request may be received (at block 1005) from the electronic device of a player to mint a pixel NFT. For example, the request may be sent when the option 580 of FIG. 5A is selected to mint pixel NFTs. Alternatively, the request may be sent when a player initially registers for playing the game. The size for the pixel NFT may be determined (at block 1010) using a weighted random algorithm. The pixel NFT may be determined to include one or more-pixel blocks. The color(s) of the pixel block(s) of the pixel NFT may be generated (at block 1015) with a weighted random algorithm.

Next, a request may be sent (at block 1020) to the blockchain smart contract application to mint the pixel NFT. The mint result (e.g., the pixel NFT ID) may be received (at block 1020) from the blockchain smart contract application. The mint result may be sent (at block 1025) to the electronic device of the player. The process 1000 may then end.

Figure 11:
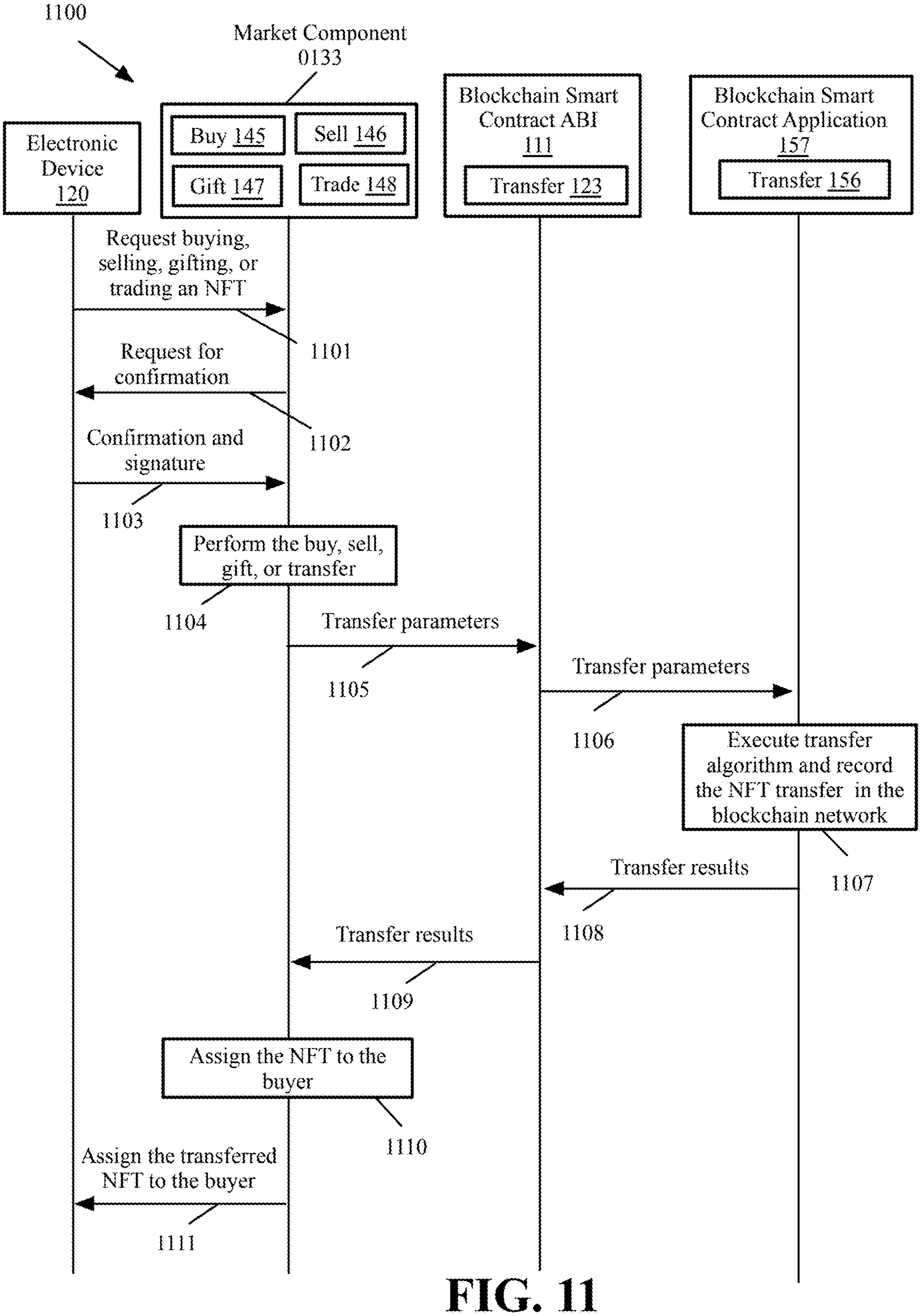
FIG. 11 is an example sequence diagram illustrating message flows and operations performed when players buy, sell, gift, or trade pixel or image NFTs, according to various aspects of the present disclosure.

FIG. 11 is an example sequence diagram 1100 illustrating message flows and operations performed when players buy, sell, gift, or trade pixel or image NFTs, according to various aspects of the present disclosure. With reference to FIG. 11, the electronic device 120 of a player may send (at step 1101) a request for buying, selling, gifting, or trading an NFT (e.g., a pixel NFT or an image NFT) to the corresponding buy function 145, sell function 146, gift function 147, or trade function 148 of the market component 133 of the video game platform 112 (FIG. 1A). For example, the request may be sent when one of the options 621-626 of FIG. 6A or one of the options 663-665 of FIG. 6B is selected.

The buy function 145, sell function 146, gift function 147, or trade function 148 of the market component 133 may send (at step 1102) a request for confirmation to the electronic device 120. The buy function 145, sell function 146, gift function 147, or trade function 148 of the market component 133 may receive (at step 1103) a confirmation and digital signature (e.g., through a digital wallet) form the electronic device 120.

The buy function 145, sell function 146, gift function 147, or trade function 148 of the market component 133 may perform (at block 1104) the buy, sell, gift, or trade operation, for example, as described above with reference to FIGS. 6A-6B and 7A-7B.

The buy function 145, sell function 146, gift function 147, or trade function 148 may then call the transfer interface 123 of the blockchain smart contract ABI 111 and may pass (at step 1105) the transfer parameters to the blockchain smart contract ABI 111. For example, the transfer parameters may include the identification of the NFT to transfer and the identification of the recipient. The identification of the NFT and the identification of the recipient may be a unique address as described above with reference to item 669 of FIG. 6B. For a buy or sell request, the transfer parameters may also include the cost (e.g., the amount of the native token of the blockchain network) of the transfer.

The transfer interface 123 of the blockchain smart contract ABI 111 may pass (at step 1106) the transfer parameters to the transfer function 156 of the blockchain smart contract application 157. The transfer function 156 of the blockchain smart contract application 157 may execute (at block 1107) a transfer algorithm and record the transfer of the NFT in the blockchain network. The transfer function 156 of the blockchain smart contract application 157 may return (at step 1108) the transfer results to the transfer interface 123 of the blockchain smart contract ABI 111. For example, the transfer results may include the success or failure status, the identification of the NFT, and the name of the previous owner and the new owner of the NFT.

The transfer interface 123 of the blockchain smart contract ABI 111 may send (at step 1109) the transfer results to the buy function 145, sell function 146, gift function 147, or trade function 148 of the market component 133 of the video game platform. The buy function 145, sell function 146, gift function 147, or trade function 148 may assign (at block 1110) the transferred NFT to the new owner. The buy function 145, sell function 146, gift function 147, or trade function 148 of the video game platform may send (at step 1111) the results to the electronic device 120 of the player.

Figure 12A:
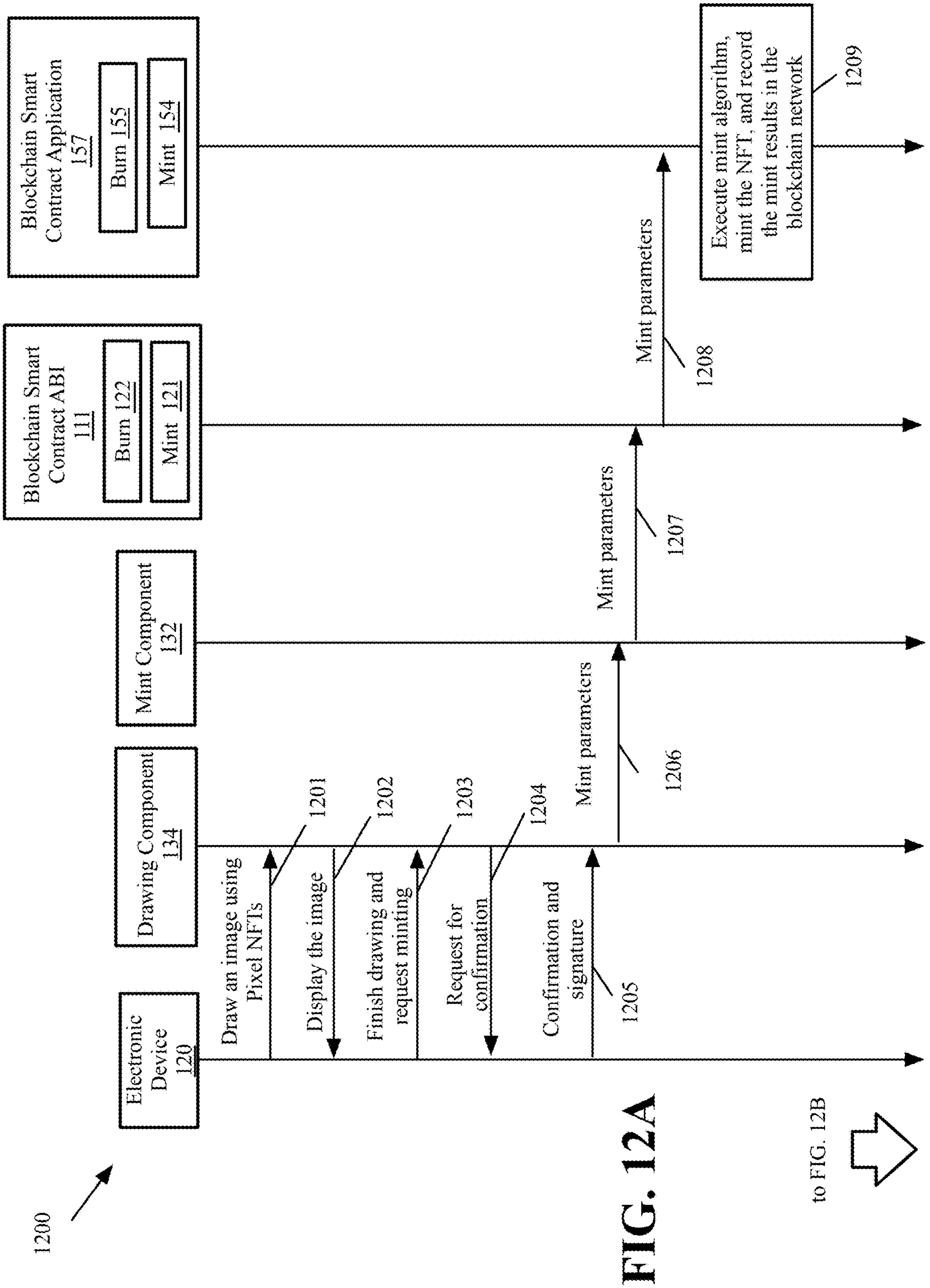
FIGS. 12A-12B are an example sequence diagram illustrating message flows and operations performed when a player uses the video game platform to draw an image NFT using pixel NFTs, according to various aspects of the present disclosure.
Figure 12B:
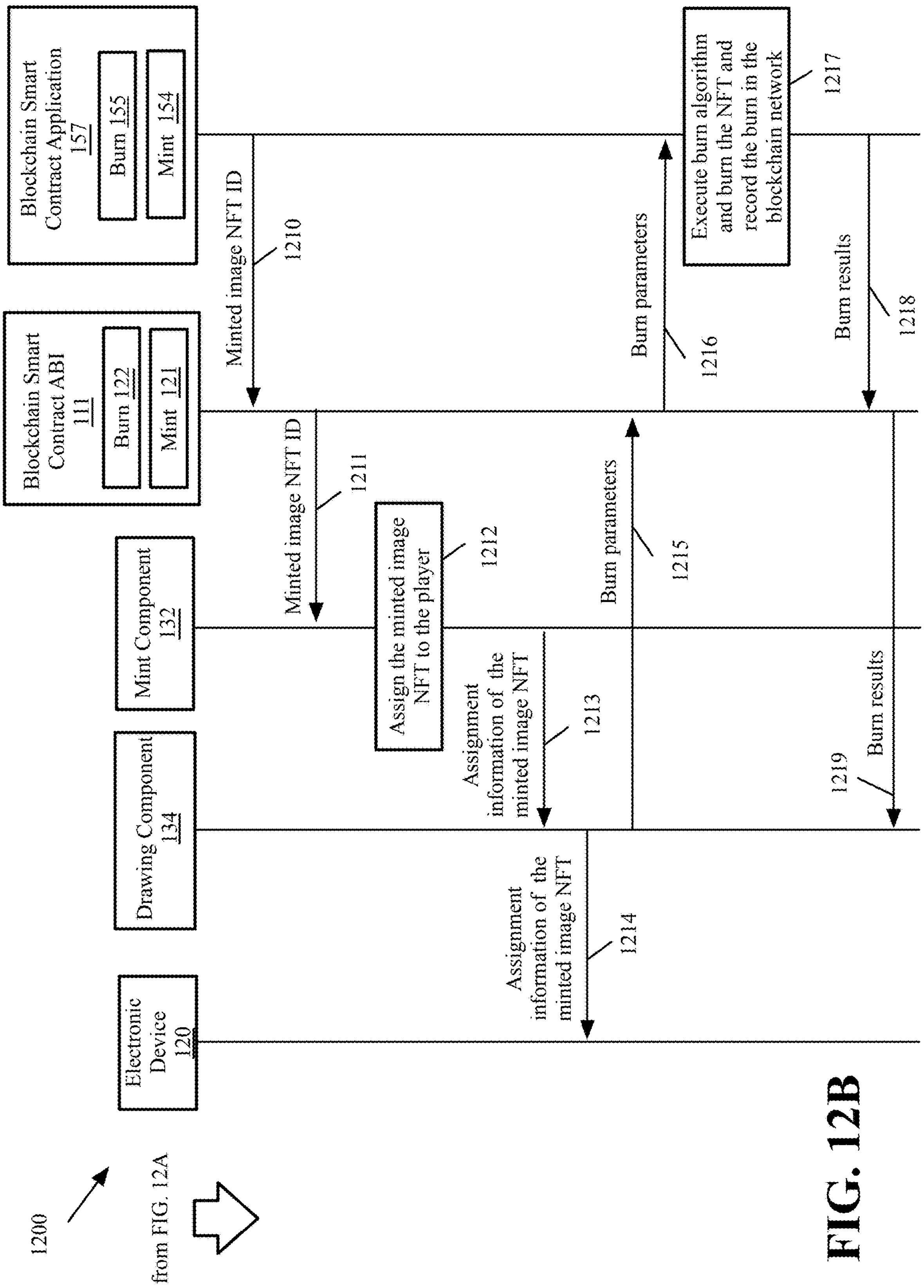

FIGS. 12A-12B are an example sequence diagram 1200 illustrating message flows and operations performed when a player uses the video game platform to draw an image NFT using pixel NFTs, according to various aspects of the present disclosure. With reference to FIGS. 12A-12B, the electronic device 120 of a player may draw (at step 1201) an image with pixel NFTs (e.g., as described above with reference to FIG. 1B) using the drawing component 134 of the video game platform 112 (FIG. 1A).

The drawing component 134 of the video game platform 112 may send (at step 1202) image updates to the electronic device 120 to display. The electronic device 120 may send (at step 1203) a request to finish drawing and request minting to the drawing component 134 of the video game platform 112. For example, the electronic device 120 may send the request to finish drawing and request minting as described above with reference to FIG. 1B and steps 807-808 of FIG. 8D and step 809 of FIG. 8E.

The drawing component 134 of the video game platform 112 may send (at step 1204) a request for confirmation to the electronic device 120. The drawing component 134 of the market component 133 may receive (at step 1205) a confirmation and digital signature (e.g., through a digital wallet) form the electronic device 120.

The drawing component 134 of the video game platform may call the mint component 132 of the video game platform and may pass (at step 1206) the mint parameters for mining the image NFT to the mint component 132. For example, the mint parameters may include a map of the position and the color of each pixel block in the image.

The mint component 132 of the video game platform may call the mint interface 121 of the blockchain smart contract ABI 111 and may pass (at step 1207) the mint parameters to the blockchain smart contract ABI 111. The mint interface 121 of the blockchain smart contract ABI 111 may pass (at step 1208) the mint parameters to the mint function 154 of the blockchain smart contract application 157. The mint function 154 of the blockchain smart contract application 157 may execute (at block 1209) a mint algorithm, mint the pixel NFT, and record the mint results in the blockchain network.

The mint function 154 of the blockchain smart contract application 157 may return (at step 1210) the minted image NFT ID and the success or failure of the minting operation. For example, the minted image NFT ID may be a unique address generated by the blockchain network and/or the video gaming platform, as described above with reference to item 669 of FIG. 6B. The blockchain network may store the metadata of the minted NFT that may be used by the video game platform to draw and display the image NFT.

The mint interface 121 of the blockchain smart contract ABI 111 may send (at step 1211) the minted image NFT ID to the mint component 132 of the video game platform. The mint component 132 of the video game platform may assign (at block 1212) the minted pixel NFT to the player. The mint component 132 of the video game platform may send (at step 1213) the assignment information to the drawing component 134 of the video game platform. For example, the assignment information may include the image ID and the player ID. The drawing component 134 of the video game platform may send (at step 1214) the assignment information to the electronic device 120 of the player.

The drawing component 134 of the market component 133 may then call the burn interface 122 of the blockchain smart contract ABI 111 and may pass (at step 1215) the burn parameters to the burn interface 122 of the blockchain smart contract ABI 111. The burn parameters, for example, may include the identification of the pixel NFTs that are used for drawing the image. The unique address of the pixel NFTs may be a unique address generated by the blockchain network and/or the video gaming platform, as described above with reference to item 669 of FIG. 6B.

The burn interface 122 of the blockchain smart contract ABI 111 may pass (at step 1216) the burn parameters to the burn function 155 of the blockchain smart contract application 157. The burn function 155 of the blockchain smart contract application 157 may execute (at block 1217) a burn algorithm and record the burn of the NFT in the blockchain network.

The burn function 155 of the blockchain smart contract application 157 may return (at step 1218) the burn results to the burn interface 122 of the blockchain smart contract ABI 111. For example, the burn results may include the identification of the burnt pixel NFTs and the success or failure status of the burn operation. The burn interface 122 of the blockchain smart contract ABI 111 may send (at step 1219) the burn results to the drawing component 134 of the video game platform.

It should be noted that some of the steps and blocks displayed in FGIS. 12A-12B may not be performed in the same order that are shown. For example, some embodiments may perform different operations such as mint or burn in different orders.

Figure 13:
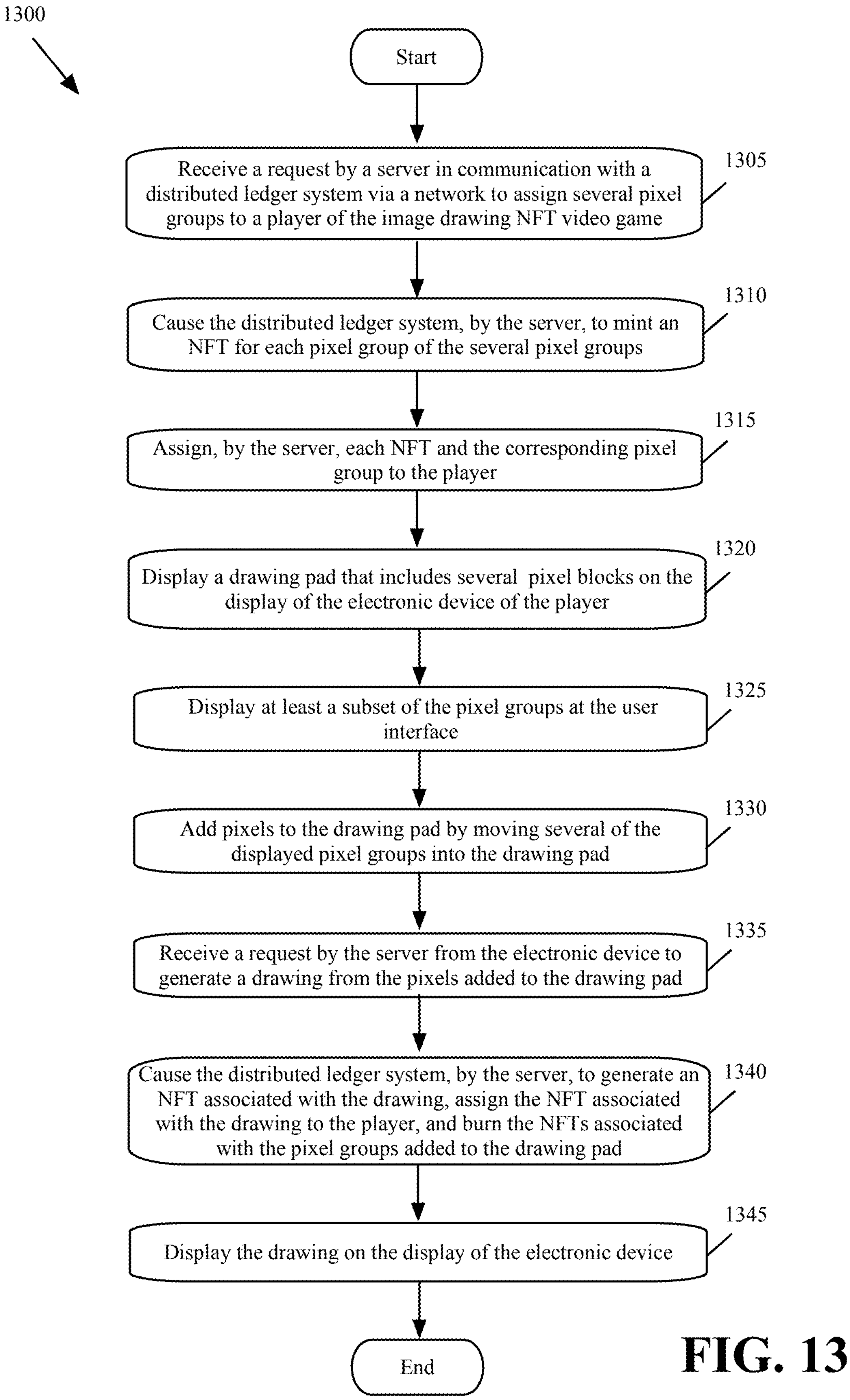
FIG. 13 is a flowchart illustrating an example process for playing an image drawing NFT video game, according to various aspects of the present disclosure.

FIG. 13 is a flowchart illustrating an example process 1300 for playing an image drawing NFT video game, according to various aspects of the present disclosure. The process 1300, in some of the present embodiments, may be performed by the processor of one or more electronic devices 115 and 120 of FIG. 1A.

With reference to FIG. 13, a request may be received (at block 1305) by a server in communication with a distributed ledger system via a network to assign several pixel groups to a player of the image drawing NFT video game. For example, the server 115, which is in communication with the blockchain network 150 via the network(s) 130 may send a request from an electronic device 120 of a player 101 to assign several pixel groups to the player. The server may cause (at block 1310) the distributed ledger system to mint an NFT for each pixel group of the several pixel groups. for example, the server may cause the distributed ledger system to mint the pixel NFTs as described above with reference to FIG. 9.

The server may assign (at block 1315) each NFT and the corresponding pixel group to the player. A drawing pad that includes several pixel blocks may be displayed (at block 1320) on the display of the electronic device of the player. For example, the drawing pad 181 may be displayed on the display 160 of the electronic device 120, as described above with reference to FIG. 1B.

At least a subset of the pixel groups may be displayed (at block 1325) at the user interface of the electronic device. For example, the pixel groups 811-816 may be displayed at the user interface of the electronic device, as described above with reference to FIG. 8A. Pixels may be added (at block 1330) to the drawing pad by moving several of the displayed pixel groups into the drawing pad. For example, pixels may be added to the drawing pad, as described above with reference to FIGS. 8A-8C.

A request may be received (at block 1335) by the server from the electronic device to generate a drawing from the pixels added to the drawing pad. For example, the request may be received when the option 188 of FIG. 1B is selected. The distributed ledger system may be caused (at block 134), by the server, to generate an NFT associated with the drawing, assign the NFT associated with the drawing to the player, and burn the NFTs associated with the pixel groups added to the drawing pad. For example, the distributed ledger system may generate an NFT associated with the drawing, assign the NFT associated with the drawing to the player, and burn the NFTs associated with the pixel groups added to the drawing pad, as described above with reference to FIGS. 8E and 12A-12B. The drawing may be displayed (at block 1345) on the display of the electronic device. For example, the image may be displayed on the display of the electronic device, as described above with reference to FIG. 8E. The process 1300 may then end.

Some of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
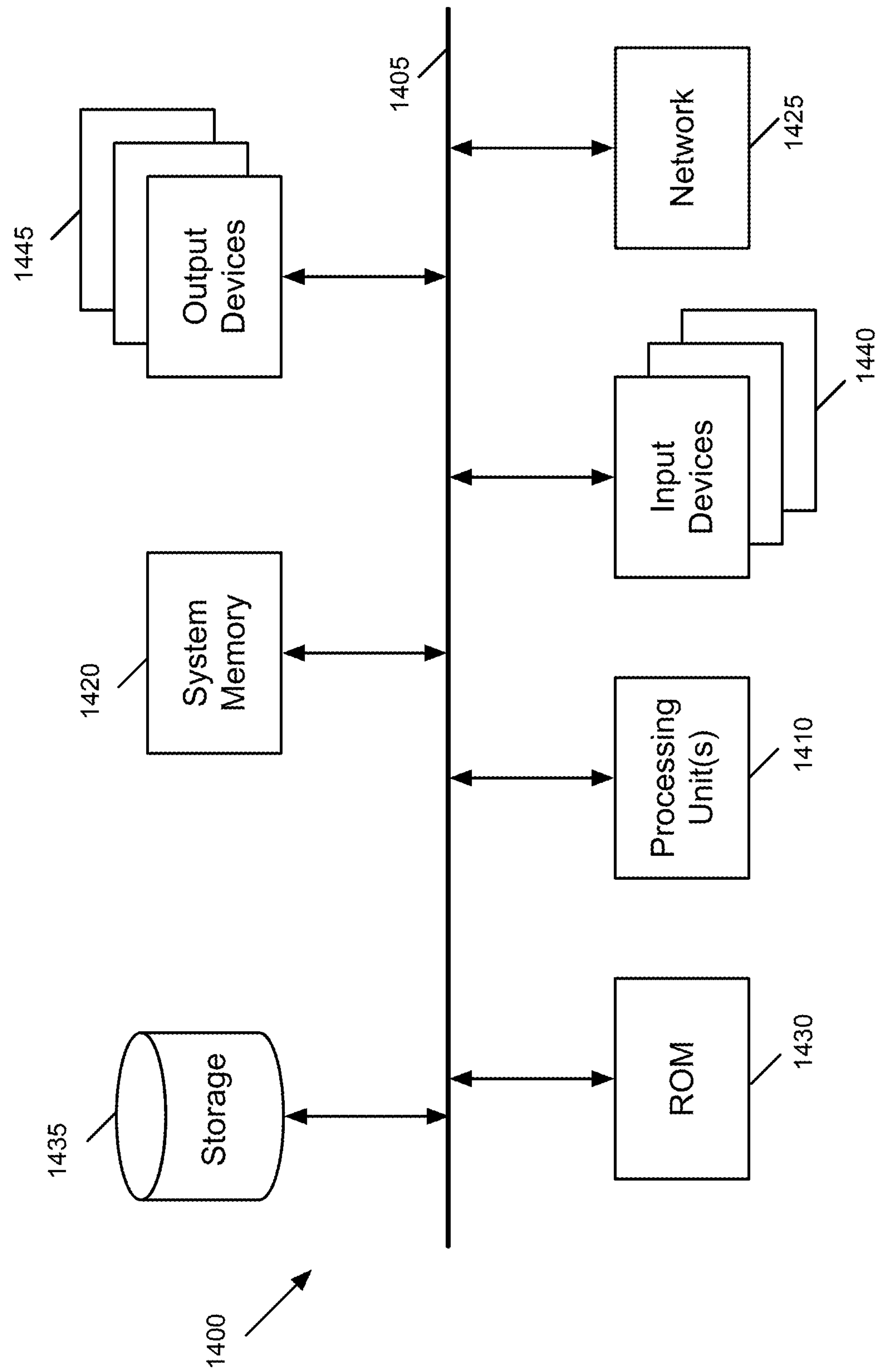
FIG. 14 conceptually illustrates an electronic system with which some embodiments of the invention are implemented.

FIG. 14 conceptually illustrates an electronic system 1400 with which some embodiments of the invention (e.g., the video game platform, the servers, the client devices, etc., described above) are implemented. The electronic system 1400 can be used to execute any of the control, virtualization, or operating system applications described above. The electronic system 1400 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1420, a read-only memory (ROM) 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1420, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1420 is a read-and-write memory device. However, unlike storage device 1435, the system memory is a volatile read-and-write memory, such as random-access memory. The system memory stores some of the instructions and data that the processor needs at runtime. In some embodiments, the invention's processes are stored in the system memory 1420, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), an Intranet, or a network of networks, such as the Internet. Any or all components of electronic system 1400 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

In a first aspect, a method of playing a non-fungible token (NFT) video game is provided. The method receives, by a server in communication with a distributed ledger system via a network, a request for several pixel groups to be assigned to a player of the NFT video game. Each pixel group includes one or more pixels. The method causes the distributed ledger system, by the server, to mint an NFT for each pixel group of the several pixel groups. The method assigns, by the server, each NFT and the corresponding pixel group to the player. The method, at a user interface of an electronic device associated with the player, displays a drawing pad that includes several pixel blocks on a display of the electronic device. Each pixel block is configured to receive one pixel from a pixel group of a pixel NFT. The method, at the user interface, displays at least a subset of the pixel groups. The method adds pixels to the drawing pad by moving several of the displayed pixel groups into the drawing pad, where moving a pixel group into the drawing pad adds the one or more pixels of the pixel group into one or more pixel blocks of the drawing pad. The method receives a request by the server from the electronic device to generate a drawing from the pixels added to the drawing pad. The method in response to the request to generate the drawing, causes the distributed ledger system, by the server, to generate an NFT associated with the drawing, assign the NFT associated with the drawing to the player, and burn the NFTs associated with the pixel groups added to the drawing pad. The method displays the drawing on the display of the electronic device.

In an embodiment of the first aspect, where each pixel is assigned one of a fixed color or a wildcard color that may be changed to any RGB or CMYK color, and at least one pixel of a pixel group in the several pixel groups is a wildcard pixel, the method further receives a request to assign an RGB or CMYK value to the wildcard pixel, and displays the wildcard pixel on the display of the electronic device with the color corresponding to the received RGB or CMYK value.

In another embodiment of the first aspect, where the drawing pad is two-dimensional, the method further receives, prior to displaying the drawing pad, dimensions of the drawing pad through the user interface, where displaying the drawing pad includes displaying the drawing pad with the received dimensions.

In another embodiment of the first aspect, where a first pixel group of the several pixel groups includes several pixels with different colors, the method further rotates the first pixel group and moves the first pixel groups into the drawing pad after rotating the first pixel group.

In another embodiment of the first aspect, the method further displays, at the display of the electronic device, a set of one or more pixel groups offered for sale by other players of the NFT video game, where each pixel group of the set of pixel groups offered for sale at an associated price. The method receives a request from the electronic device to buy a first pixel group in the set of pixel groups at the associated price, causes the distributed ledger system, by the server, to transfer an NFT associated with the first pixel group from an owner of the first pixel group to the player, and displays the first pixel group at the user interface of the electronic device.

In another embodiment of the first aspect, the method further transfers the price associated with the first pixel group from an account of the player to an account of the owner of the first pixel group.

In another embodiment of the first aspect, the price includes one or more native tokens of the distributed ledger system.

In another embodiment of the first aspect, the price includes a fiat currency.

In another embodiment of the first aspect, where the price includes the player is a first player, the method further receives a request at the server from the electronic device associated with the first player to sell the drawing, where the request includes a price for selling the drawing. The method provides an image of the drawing and the price to electronic devices of a set of players other than the first player, receives a request to buy the drawing at the price from an electronic device of a second player of the of the set of players, and causes the distributed ledger system, by the server to transfer the NFT associated with the drawing from the first player to the second player.

In another embodiment of the first aspect, the method further transfers the price from an account of the second player to an account of the first player.

In another embodiment of the first aspect, where the player is a first player, the method further receives a request from the electronic device associated with the first player to sell the drawing, where the request includes a first price for selling the drawing. The method provides an image of the drawing and the price to electronic devices of a set of players other than the first player, receives an offer to buy the drawing at a second price different than the first price from a second player in the set of one or more players, and sends the offer to the first player.

In another embodiment of the first aspect, the method further receives an acceptance of the offer from the first player and in response to receiving the acceptance, causes the distributed ledger system, by the server, to transfer the NFT associated with the drawing from the first player to the second player.

In another embodiment of the first aspect, the method further transfers the second price from an account of the second player to an account of the first player.

In another embodiment of the first aspect, generating the NFT associated with the drawing includes receiving an electronic signature from an electronic wallet associated with the player and generating the NFT associated with the drawing in response to receiving the electronic signature.

In another embodiment of the first aspect, the method further transfers the NFT associated with the drawing to the wallet.

In another embodiment of the first aspect, the method further displays an identification of the NFT associated with the drawing in a list of NFTs stored in the wallet.

In another embodiment of the first aspect, where the player is a first player, the method further receives a request from the electronic device associated with the first player to sell one or more pixel groups assigned to the first player, the request includes a price for selling each pixel group, provides an image of each pixel and the associated price to electronic devices of a set of players other than the first player, receives a request to buy a first pixel group at the associated price from a second player in the set of one or more players, and causes the distributed ledger system, by the server, to transfer an NFT associated with the first pixel group from the first player to the second player.

In another embodiment of the first aspect, the method further transfers the price associated with the first pixel group from an account of the second player to an account of the first player.

In another embodiment of the first aspect, the method further displays, prior to receiving the request for the several pixel groups, a search panel at the user interface of the electronic device of the player. The method receives a set of one or more pixel group attributes, where the attributes include one or more of a size of each pixel group and a color of at least one pixel of each pixel group. The method displays one or more pixel groups that satisfy the search attribute and receives the request from the player for the several pixel groups in response to the player selecting one or more of the displayed pixel groups.

In another embodiment of the first aspect, the distributed ledger system is a blockchain network.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method of playing a non-fungible token (NFT) video game, the method comprising:
- receiving, by a server in communication with a distributed ledger system via a network, a request for a plurality of pixel groups to be assigned to a player of the NFT video game, each pixel group of the plurality of pixel groups comprising one or more pixels;
- causing the distributed ledger system, by the server, to mint an NFT for each pixel group of the plurality of pixel groups;
- assigning, by the server, each NFT and the corresponding pixel group to the player;
- at a user interface of an electronic device associated with the player, displaying a drawing pad comprising a plurality of pixel blocks on a display of the electronic device, each pixel block configured to receive one pixel from a pixel group of an NFT;
- at the user interface, displaying at least a subset of the plurality of pixel groups;
- adding pixels to the drawing pad by moving a plurality of the displayed pixel groups into the drawing pad, wherein moving a pixel group into the drawing pad adds the one or more pixels of the pixel group into one or more pixel blocks of the drawing pad;
- receiving a request by the server from the electronic device to generate a drawing from the pixels added to the drawing pad;
- in response to the request to generate the drawing, causing the distributed ledger system, by the server, to:
  - generate an NFT associated with the drawing;
  - assign the NFT associated with the drawing to the player; and
  - burn the NFTs associated with the pixel groups added to the drawing pad; and
- displaying the drawing on the display of the electronic device.

2. The method of claim 1, wherein each pixel is assigned one of a fixed color or a wildcard color that may be changed to any RGB or CMYK color, wherein at least one pixel of a pixel group in the plurality of pixel groups is a wildcard pixel, the method further comprising:
- receiving a request to assign an RGB or CMYK value to the wildcard pixel; and displaying the wildcard pixel on the display of the electronic device with the color corresponding to the received RGB or CMYK value.

3. The method of claim 1, wherein the drawing pad is two-dimensional, the method further comprising:

prior to displaying the drawing pad, receiving dimensions of the drawing pad through the user interface;

wherein displaying the drawing pad comprises displaying the drawing pad with the received dimensions.

4. The method of claim 1, wherein a first pixel group of the plurality of pixel groups comprises a plurality of pixels with different colors, the method further comprising:

rotating the first pixel group; and moving the first pixel group into the drawing pad after rotating the first pixel group.

5. The method of claim 1 further comprising:

displaying, at the display of the electronic device, a set of one or more pixel groups offered for sale by other players of the NFT video game, each pixel group of the set of pixel groups offered for sale at an associated price;

receiving a request from the electronic device to buy a first pixel group in the set of pixel groups at the associated price;

causing the distributed ledger system, by the server, to transfer an NFT associated with the first pixel group from an owner of the first pixel group to the player; and displaying the first pixel group at the user interface of the electronic device.

6. The method of claim 5 further comprising transferring the price associated with the first pixel group from an account of the player to an account of the owner of the first pixel group.

7. The method of claim 6, wherein the price comprises one or more native tokens of the distributed ledger system.

8. The method of claim 6, wherein the price comprises a fiat currency.

9. The method of claim 1, wherein the player is a first player, the method further comprising:

receiving a request at the server from the electronic device associated with the first player to sell the drawing, the request comprising a price for selling the drawing;

providing an image of the drawing and the price to electronic devices of a set of players other than the first player;

receiving a request to buy the drawing at the price from an electronic device of a second player of the set of players; and causing the distributed ledger system, by the server, to transfer the NFT associated with the drawing from the first player to the second player.

10. The method of claim 9 further comprising transferring the price from an account of the second player to an account of the first player.

11. The method of claim 1, wherein the player is a first player, the method further comprising:

receiving a request from the electronic device associated with the first player to sell the drawing, the request comprising a first price for selling the drawing;

providing an image of the drawing and the first price to electronic devices of a set of players other than the first player;

receiving an offer to buy the drawing at a second price different than the first price from a second player in the set of players; and sending the offer to the first player.

12. The method of claim 11 further comprising:

receiving an acceptance of the offer from the first player; and in response to receiving the acceptance, causing the distributed ledger system, by the server, to transfer the NFT associated with the drawing from the first player to the second player.

13. The method of claim 12 further comprising transferring the second price from an account of the second player to an account of the first player.

14. The method of claim 1, wherein generating the NFT associated with the drawing comprises:

receiving an electronic signature from an electronic wallet associated with the player; and generating the NFT associated with the drawing in response to receiving the electronic signature.

15. The method of claim 14 further comprising transferring the NFT associated with the drawing to the wallet.

16. The method of claim 14 further comprising displaying an identification of the NFT associated with the drawing in a list of NFTs stored in the wallet.

17. The method of claim 1, wherein the player is a first player, the method further comprising:

receiving a request from the electronic device associated with the first player to sell one or more pixel groups assigned to the first player, the request comprising a price for selling each pixel group;

providing an image of each pixel group and the associated price to electronic devices of a set of players other than the first player;

receiving a request to buy a first pixel group at the associated price from a second player in the set of one or more players; and causing the distributed ledger system, by the server, to transfer an NFT associated with the first pixel group from the first player to the second player.

18. The method of claim 17 further comprising transferring the price associated with the first pixel group from an account of the second player to an account of the first player.

19. The method of claim 1 further comprising:

prior to receiving the request for the plurality of pixel groups, displaying a search panel at the user interface of the electronic device of the player;

receiving a set of one or more pixel group search attributes, the attributes comprising one or more of a size of each pixel group and a color of at least one pixel of each pixel group;

displaying one or more pixel groups that satisfy the search attributes; and receiving said request from the player for the plurality of pixel groups in response to the player selecting one or more of the displayed pixel groups.

20. The method of claim 1, wherein the distributed ledger system is a blockchain network.

* * * * *